US012675933B2

(12) United States Patent
Seder

(10) Patent No.: US 12,675,933 B2
(45) Date of Patent: Jul. 7, 2026

(54) CONVEX-LENSED ZOETROPE WITH CENTRAL IMAGE HUB

(71) Applicant: Rufus Butler Seder, Arlington, MA (US)

(72) Inventor: Rufus Butler Seder, Arlington, MA (US)

( * ) Notice: Subject to any disclaimer, the term of this patent is extended or adjusted under 35 U.S.C. 154(b) by 446 days.

(21) Appl. No.: 18/394,590

(22) Filed: Dec. 22, 2023

(65) Prior Publication Data

US 2024/0212253 A1 Jun. 27, 2024

Related U.S. Application Data

(60) Provisional application No. 63/435,436, filed on Dec. 27, 2022.

(51) Int. Cl.

| | |
|---|---|
| ***G03B 25/00*** | (2006.01) |
| ***G02B 27/06*** | (2006.01) |
| ***G06T 7/64*** | (2017.01) |
| ***G06T 13/80*** | (2011.01) |

(52) U.S. Cl.
CPC ................ *G06T 13/80* (2013.01); *G06T 7/64* (2017.01)

(58) Field of Classification Search
CPC ........ G02B 27/06; G06T 13/80; G03B 25/00; G03B 25/02
See application file for complete search history.

(56) References Cited

U.S. PATENT DOCUMENTS

| | | | |
|---|---|---|---|
| 1,014,365 | A | 1/1912 | Bourgin |
| 1,214,636 | A | 2/1917 | Zinn |
| 1,804,260 | A | 5/1931 | Kerr |
| 1,925,136 | A | 9/1933 | Harvey |
| D180,372 | S | 5/1957 | Morgan |
| 2,985,057 | A | 5/1961 | Morgan |
| 3,694,062 | A | 9/1972 | Koenig |
| 3,700,880 | A | 10/1972 | Smith |

(Continued)

OTHER PUBLICATIONS

Animation Praxinoscope, www.scientificsonline.com/animation-praxinoscope.html web page, Edmund Scientific's, Tonawanda, NY, USA.

(Continued)

*Primary Examiner* — Ryan D Howard

(74) *Attorney, Agent, or Firm* — Thomas P. O'Connell; O'Connell Law Firm

(57) ABSTRACT

A convex-lensed zoetrope for providing bright, clear, and straight-on animation. An image hub retains images in series for animation, and an outer drum concentrically rotates with the image hub. The outer drum is at least partially transparent, and a plurality of convex Fresnel lenses retained along a ring shape form a lens structure retained by the outer drum. During rotation of the outer drum, the lens structure, and the inner image hub, the animation of images retained on the image hub can be viewed in a straight-on manner through the transparent outer drum and the convex lenses retained thereby. The Fresnel lenses can comprise lens sheets with an outwardly-facing lensed surface and an inwardly-facing flat surface. Animation members, such as animation strips, can be selectively applied to encircle the image hub, and alignment formations of the animation members and the image hub promote alignment of the images with the lenses.

36 Claims, 32 Drawing Sheets

(56) References Cited

U.S. PATENT DOCUMENTS

| | | | | |
|---|---|---|---|---|
| 3,951,529 | A | 4/1976 | Gandia | |
| 4,085,932 | A | 4/1978 | Hamano | |
| 4,307,528 | A | 12/1981 | Dewees | |
| 5,760,874 | A | 6/1998 | Rudnick | |
| 5,870,170 | A | 2/1999 | Pope | |
| 5,901,484 | A | 5/1999 | Seder | |
| 5,905,564 | A | 5/1999 | Long | |
| 6,097,468 | A | 8/2000 | Muehlenhard | |
| 6,286,873 | B1 | 9/2001 | Seder | |
| 6,647,651 | B2 | 11/2003 | Cutright | |
| 6,781,761 | B2 | 8/2004 | Raymond | |
| 6,886,280 | B2 | 5/2005 | Spodek et al. | |
| 7,151,541 | B2 | 12/2006 | Seder | |
| 7,331,132 | B1 | 2/2008 | Seder | |
| 7,940,371 | B2 | 5/2011 | Barnett | |
| 8,373,384 | B2 | 2/2013 | Seder | |
| 9,488,903 | B1 | 11/2016 | Veras de Souza | |
| 2002/0105808 | A1 | 8/2002 | Ting Yup | |
| 2003/0223042 | A1 * | 12/2003 | Rudnick | G03B 25/00 352/101 |
| 2005/0007566 | A1 | 1/2005 | Burder | |
| 2008/0129963 | A1 | 6/2008 | Hohl | |
| 2008/0266523 | A1 * | 10/2008 | Otsuka | H04N 13/349 348/E13.058 |
| 2009/0141241 | A1 | 6/2009 | Buyssens | |
| 2016/0184730 | A1 | 6/2016 | Seder | |

OTHER PUBLICATIONS

Gomorrans Praxinoscope, www.youtube.com, Gomorrans Praxinoscope from 'Giving Birth to Love' LP Side A, 2009, Gomorrans Social Aid & Pleasure Club.

* cited by examiner

CONVEX-LENSED ZOETROPE WITH CENTRAL IMAGE HUB

RELATED APPLICATION

This application claims priority to U.S. Provisional Application No. 63/435,436, filed Dec. 27, 2022, which is incorporated herein by reference.

FIELD OF THE INVENTION

The present invention relates generally to zoetropes. More particularly, disclosed herein is a zoetrope with a plurality of circumferentially spaced convex lenses capable of displaying bright, sharp, non-distorted animating images that are unobstructed, of appreciable size, and that can be viewed in a direct, straight-on manner.

BACKGROUND OF THE INVENTION

The zoetrope, the name derived from the Greek 'zoo' for animal life and 'trope' for "things that turn," was invented in 1834 by English mathematician William George Horner in the early form of a hand-operated motion picture device. Such a zoetrope is shown in FIG. 1. Horner's zoetrope was made of a drum of cardboard or metal with a plurality of spaced vertical slots. An interchangeable strip of paper with a corresponding plurality of printed drawings sequenced to represent a scene in motion is disposed around the drum's lower inner circumference. When the drum is rapidly rotated on its axis by the user and the picture strip is viewed through the sweeping slots, the images magically appear to come to life and move realistically. The observer's suspension of disbelief is further augmented through shrewd design of the animation strips' sequences, which are typically designed to cycle, that is, to repeat the same action smoothly and without interruption as the drum continuously rotates.

A zoetrope, which is relatively inexpensive to produce due to its elegance of design, can be rotated at a variable speed to create slow-motion or accelerated animation effects or, if rotated oppositely, a backward animation effect. Like other motion simulation devices, the illusion of animation depends on the human retina's retention of an image for approximately one tenth of a second. Therefore, if a new image appears within that time, the sequence of drawings will appear to be uninterrupted and continuous. Motion simulation also depends on what is referred to as the Phi phenomenon under which the human brain attempts to make sense out of any sequence of impressions, relating them to each other continuously.

While Horner's slotted zoetrope is delightful to experience, it exhibits a number of deficiencies. For instance, the animated images displayed are dark due to the thin slots and the constant interruption presented by the dark wall sections of the drum between them. The images are also blurry. Moreover, the wider the slots are made to brighten the dark image, the blurrier the images become. Further, the images are distorted, horizontally "squashed," by the optical effect of the slots moving in one direction and the image on the opposite side of the drum moving in the other. Further, because the picture strip must be positioned in the device directly below the viewing slots to avoid blocking them, one can only view the animation at a slightly downward angle as in FIG. 2. The animation cannot be viewed in a direct, straightforward fashion.

The image darkness discourages the use of subtle coloring to augment the animated artwork, and the blurriness discourages the application of fine detail. Also, in anticipation of the horizontal "squashing" of the image that will occur when viewed in such a device, the artist designing an animation strip for such devices must endeavor to illustrate subjects in a "stretched out," elongated form, essentially counter-distorting the images in advance. These undesirable attributes of Horner's zoetrope are, unfortunately, inextricably bound to the very things that achieve the animation effect.

Thirty-four years later, in 1868, the eminent scientist James Clerk Maxwell succeeded in eliminating two of these problems, specifically the animated image's blur and distortion, by substituting a series of small concave lenses in place of Horner's slots as in the device of FIG. 3. Because such concave lenses have a focal length equaling the diameter of the cylinder, the virtual image is brought forward optically and is thus seen at the center axis of rotation of the drum. This produces a desired, novel optical effect as is depicted in FIG. 4. As the drum is rotated, the centrally located virtual image functions to give the impression of momentarily stopping each successive drawing optically thereby producing a steady, sharply defined and correctly proportioned animation.

Despite the animation thus displayed being almost as dark as Horner's and despite having to be viewed at a slightly downward angle, Maxwell's solution would have represented a major advance over Horner's but for one altogether new problem. The concave lenses, in performing the desired function of placing the virtual image at the central axis, simultaneously cause the undesired effect of reducing the size of the original animated image by half, making it extremely tiny to view.

The question becomes why Maxwell did not replace his concave lenses with convex lenses in the hope of restoring the images to something resembling their original size. The likely explanation is that Maxwell, well versed in optics, would have known that a convex lens, instead of serving to bring the virtual image of the animation strip forward to the central axis, would instead have the undesirable effect of pushing the image even farther away from the axis than the animation strip itself. In other words, while the virtual image viewed through a convex lens would indeed appear larger, it would simultaneously appear to be located beyond the far exterior of drum itself, not at the central axis. As a result, the image would be a visually indecipherable blur when the drum was rotated as is illustrated in FIG. 5.

Perhaps as a result of the problems described above, possibly together with the prohibitive cost of lenses at the time, Maxwell's concave-lensed zoetrope never gained commercial success. To the present inventor's knowledge, only one working model survives, which is today in the Cavendish Library museum in Cambridge, UK. Sadly, since the abandonment of Maxwell's concave-lensed zoetrope more than 150 years ago, no significant improvements to the zoetrope have been made. Meanwhile, Horner's original, slotted zoetrope, which was popularized with nineteenth century audiences by game pioneer Milton Bradley, still continues to hold sway.

Today, toy zoetropes continue to be sold, and larger interactive versions can be found on display in science museums, children's museums, and in other public places around the world. Without fundamentally changing Horner's original zoetrope design, artists and inventors continue to conceive of novel applications. For example, in 1980, experimental filmmaker Bill Brand reimagined the zoetrope as a long, flat, slotted curtain wall positioned in front of a giant banner printed with multiple images. He installed it in New York's Myrtle Subway Station as shown in FIG. 6. In 2005, David Burder disclosed a flat, hand-held, linear zoetrope with U.S. Patent Application Publication No. 2005/0007566A1, ultimately abandoned, where lenses were substituted for slots as shown in FIGS. 7 and 8. However, one attempting to transform Burder's flat zoetrope into a rotary zoetrope would find themselves in precisely the same quandary as Maxwell as discussed above.

Many other related animation devices preceded and followed the Zoetrope, some more obscure than others. One is Josef Plateau's slotted, flat rotating, mirror-viewed disk Phenakistoscope of 1832, which is depicted in FIG. 9. Plateau's device was a direct predecessor to the zoetrope. In a further development in 1860, Pierre-Hubert Desvignes created a flip book with sequential images for providing animation when the pages are viewed in rapid succession.

Charles-Émile Reynaud's praxinoscope, invented in 1877, bears much in common with Horner's and Maxwell's zoetropes. The praxinoscope employs a multifaceted, mirrored hub that reflects an animation strip that is printed with reversed images. As FIG. 11 shows, the animation strip is positioned in a manner similar to a zoetrope directly within a surrounding drum wall with the picture side facing inward. Mirrors are aligned to be perfectly parallel to the image strip thereby positioning a virtual image at the center axis of the rotating drum, momentarily giving the perception of "stopping" each image in a manner similar to that achieved by the concave lenses in Maxwell's zoetrope but without reducing their size. The images displayed in this manner are crisp, bright, and undistorted. However, the image is more challenging to view than Horner's and Maxwell's, which again must be viewed at a slightly downward angle. Because the mirrored hub, by necessity, is buried within the wall of the surrounding drum, the reflected animated image must first be located in the mirror by the user and then viewed at a steep downward angle.

While modified versions of the praxinoscope have been designed to enable more direct, straight-on viewing, they fail to deliver a completely crisp, clear animation. In the most popular modified version, instead of positioning the mirrors exactly parallel to the picture, the mirrored hub is disposed in a truncated form with its mirrors diagonally angled downward, and the image member—which in this instance is an image disk—is positioned flat beneath it with the images arranged circumferentially, aiming upwardly. Such a device is shown in FIG. 12 where images of a windmill blade are fixed upon a vertical, stationary post. The reflected animation can now be viewed more directly straight-on than in the original praxinoscope. However, when the device is rotated, the clarity of the animating image suffers from the undesirable visual impression that portions of the animating image are displaced at odd angles. For instance, as FIG. 13 shows, the windmill's single, vertical pole in this example appears doubled and splayed out in two directions simultaneously. This visual image displacement is due to the fact that the mirrors are not exactly parallel to the picture. Only one area of each successive image—the area exactly at the virtual center axis of rotation—appears to "stop" fully. As FIG. 14 illustrates, the other areas of the virtual image remain in motion because they are either nearer or farther than the central axis of rotation. In spite of this visual imperfection, this version of the praxinoscope has enjoyed popularity in the marketplace, apparently due to the public's prioritization of direct, straight-on, unobstructed viewing even over the quality of the image.

More recently, with U.S. Pat. No. 9,488,903, Christine Veras disclosed a zoetrope with a series of three-dimensional sculptures rotating around a small, internally lit, slotted drum. The Veras device permits direct, straight-on viewing of what appears to be a silhouetted image hovering and animating at the center of the drum. While the visual effect is certainly both innovative and novel, the images thus displayed suffer from the same deficiencies as Horner's in that they are incapable of showing detail or color and can be blurry.

In view of the history and state of the art as described above, it is apparent that there is a real and long-felt need for a relatively inexpensive zoetrope capable of displaying bright, sharp, non-distorted images of appreciable size that are unobstructed and that can be viewed in a direct, straight-on manner.

SUMMARY OF THE INVENTION

The present invention is thus founded on the basic object of providing a zoetrope that displays bright and sharp images of appreciable size without distortion or obstruction.

A further object of the invention is to provide a zoetrope that permits images to be viewed in a direct, straight-on manner.

Another object of embodiments of the invention is to provide a zoetrope that provides bright and sharp animation without a need for motorization or dedicated illumination.

In alternative embodiments, an object of the invention is to provide a zoetrope that is operable with motorization through electrical power harvested by photovoltaics.

These and further objects and advantages of manifestations of the present invention will become obvious not only to one who reviews the present specification and drawings but also to those who have an opportunity to experience embodiment of the convex-lensed zoetrope disclosed herein in operation. However, it will be appreciated that, while the accomplishment of each of the foregoing objects in a single embodiment of the invention may be possible and indeed preferred, not all embodiments will seek or need to accomplish each and every potential advantage and function. Nonetheless, all such embodiments should be considered within the scope of the present invention.

In considering the present invention and the objects achieved thereby, one will observe that the present inventor has a history of revisiting optical animation techniques that have been largely abandoned, that were thought to have outlived their useful appeal, or that stagnated for many years and then reinventing them in novel, even apparently counterintuitive ways with the proven result of sparking renewed public interest in them. For example, his inventive contribution to the art of barrier grid animation disclosed in U.S. Pat. No. 7,151,541 led to the worldwide success of his self-animating books sold under the registered trademark Scanimation® with more than six million copies sold in sixteen languages. In devising such inventions, the inventor has become convinced that historically, mistaken assumptions about such technologies—almost always based on a simple acceptance of precedent—have impeded and even halted the further development of technologies that otherwise might have flourished.

For instance, made aware of the invention disclosed therein, one will appreciate that the opportunity to conceive of the present invention existed even in Maxwell's time more than 150 years ago, but it was not. Moreover, because Maxwell, Reynaud (with the praxinoscope), and others failed to question the placement of the image strip previously established by Horner, the precedent was solidified and unquestioned. For more than 150 years, that precedent was not challenged by even one inventor, including the present one as is evidenced by his several previous patents relating to zoetropes and praxinoscopes.

In fact, and perhaps surprisingly, the genesis of the present invention had nothing to do with this inventor's having the goal of improving upon Maxwell's concave-lensed zoetrope, particularly since he did not know of it at the time. Instead, this inventor initially set out to create a "Solartrope," a sunlight-illuminated zoetrope that would permit viewing of the animation effect directly upon the rotating animation strip itself. To accomplish this, he replaced a zoetrope's slots with a drum-shaped array of convex cylindrical lenses that each had a focal length equivalent to the diameter of the drum. Thus, when placed outdoors in direct sunlight, the lenses focused thin, bright bars of sunlight onto the animation picture strip opposite them with the animation strip fitted within the inner shell of the drum in the exact manner set by Horner's precedent. As FIG. 15 illustrates, when the drum was rotated, bars of sunlight sweeping in one direction over the animated drawings rolling in the other direction created a slot-strobing effect similar to Horner's, but with the animation appearing to happen directly upon the surface of the animation strip itself so that there was no need for viewing through slots.

As often happens in the process of invention, while developing that device, this inventor experimented with different configurations of lenses and animation strips seeking to perfect it. In so doing, he discovered—admittedly to his surprise—a completely new effect: by introducing a small-diameter hub affixed to the middle of the drum and with an animation strip wrapped around it, a convincing, bright and remarkably clear animation effect resulted when the image was viewed through the rotating lenses. However, the animated subjects in that device were somewhat elongated by the previously installed cylindrical lenses. Due to his extensive familiarity with other animation devices, and in particular, his knowledge of Reynaud's mirrored praxinoscope, this inventor immediately recognized that the effect was caused by the succession of virtual images being temporarily "stopped" at the central axis of rotation. The present invention was then born as it struck the inventor to substitute normal convex lenses for the cylindrical ones while optimally sizing the diameter of the drum to more perfectly position the virtual image at the center of the device.

In carrying forth one or more objects of the invention, an embodiment of the zoetrope incorporates a plurality of convex lenses retained along a ring shape to form a lens structure. Within the scope of the claimed invention, the ring shape can be round, polygonal, or otherwise shaped except as expressly excluded by the claims. The convex lenses are positioned to have foci within the ring shape. An inner image hub is retained for concentric rotation with the lens structure, and the image hub is adapted to retain images in series for animation. Under such constructions, a rotation of the inner image hub and the plurality of convex lenses yields a display of bright, sharp, non-distorted animating images that are unobstructed, of appreciable size, and that can be viewed through the lenses of the lens structure in a direct, straight-on manner.

In accordance with the invention, the plurality of convex lenses can comprise Fresnel convex lenses, such as but not limited to Fresnel lens sheets. It is also disclosed that the zoetrope can employ Fresnel convex lenses that are flexible, such as by being formed of plastic, and adapted to be curved to form a substantially cylindrical lens structure. The Fresnel lens sheets can each have a lensed surface and a flat surface, and the Fresnel lens sheets can be positioned with the lensed surface facing outwardly and the flat surface facing inwardly.

Embodiments of the zoetrope further can further include an outer drum, which can be at least partially transparent, retained for concentric rotation with the inner image hub. In such embodiments, the plurality of convex lenses can be retained by the outer drum, such as by being fixed or otherwise disposed therewithin. The image hub and the outer drum can, for instance, be rotatably supported by a support arm. It is disclosed that the zoetrope can further comprise a base wall that is rotatably retained by the support arm, and the image hub and the outer drum can be retained by the base wall to rotate concentrically. The base wall could be a transparent, continuous wall, spokes, or any other configuration that allows as much ambient light as possible to enter the zoetrope to provide the brightest possible animation. With that, the outer drum, the image hub, and the base wall together form a rotatable structure.

The zoetrope can further include an animation member for being disposed to encircle the image hub. A plurality of images can be disposed on the animation member, such as by being partially or entirely pre-printed or partially or entirely applied by a user. For instance, animation members can be formed as animation strips adapted to be formed into cylindrical shapes. The number of images on the animation member ideally corresponds to the number of lenses in the lens structure, and the images are ideally retained in alignment with each respective lens. Such animation members can have alignment formations, such as notches or other formations, disposed thereon, and the image hub can have corresponding alignment formations, such as one or more protuberances adapted for engaging the alignment formations of the animation members. Further, the image hub can have a distal end that is tapered to receive an animation member thereover. With this, an animation member can be selectively applied to the image hub, and an alignment of the animation member with the image hub can be facilitated to ensure the alignment of the images disposed on the animation member with the lenses of the lens structure.

In certain manifestations, the image hub can have a diameter calculated mathematically, such as by use of the following formula:

$$o = \frac{1}{\frac{1}{i} + \frac{1}{f}}$$

$o$ = object distance $i$ = virtual image distance $f$ = focal distance of lens

In other practices, the optimal diameter of the image hub can be determined experimentally. For instance, a target template can be employed for determining the preferred diameter of the image hub. Such a target template as disclosed herein can have a plurality of lines that emanate from a center thereof corresponding in plurality to the plurality of convex lenses, and the target template can further have a plurality of concentric circles in spaced relation to one another that are concentric with the center of the target template. Under such practices, the target template can be disposed concentrically within the lens structure. Then, with the target template therewithin, the lens structure and the image hub can be rotated, causing the visual effect that the emanating lines appear to cross one another at a specific point in the array of concentric circles, and a circle can then be hand-drawn in that area while the target template, the lens structure, and the image hub are rotating. So applied, this hand-drawn circle corresponds in diameter to an ideal diameter of the image hub.

Embodiments of the zoetrope are also disclosed wherein the image hub is adapted to retain a plurality of animation members, such as animation cards. Images on the animation members are designed to be disposed in series in an order of animation. In such embodiments, the animation members can be selectively received and retained within slots or other retention mechanism spaced around the perimeter of the image hub thereby to encircle the image hub. It is further disclosed that a camouflaged place indication indicative of the respective place in the order of animation of the animation card can be disposed on each animation card. The camouflaged place indication can be adapted to be revealed by application of an optical filter.

While embodiments of the zoetrope can be operable without electricity or other power or motorization, embodiments are also contemplated wherein an electric motor is operable to rotate the inner image hub and the plurality of convex lenses. In such embodiments, electric power can be provided by any source. However, it is further disclosed herein to harvest power by operation of a photovoltaic panel electrically connected to the electric motor that provides electricity thereto. A support structure, such as a support arm and support stand, can rotatably support the image hub and the plurality of convex lenses. Still further, it is taught herein that the photovoltaic panel can be retained at a distal end of an extendable support arm that has a proximal end retained by the support structure. With that, electric power can be harvested by the photovoltaic panel and supplied to the electric motor to rotate the image hub and the convex lenses.

One will appreciate that the foregoing discussion broadly outlines certain more important goals and features of the invention to enable a better understanding of the detailed description that follows and to instill a better appreciation of the inventor's contribution to the art. Before any particular embodiment or aspect thereof is explained in detail, it must be made clear that the following details of construction and illustrations of inventive concepts are mere examples of the many possible manifestations of the invention.

BRIEF DESCRIPTION OF THE DRAWINGS

The present invention will be described and explained with additional specificity and detail through reference to the accompanying drawings wherein.

DETAILED DESCRIPTION OF PREFERRED EMBODIMENTS

Figure 1:
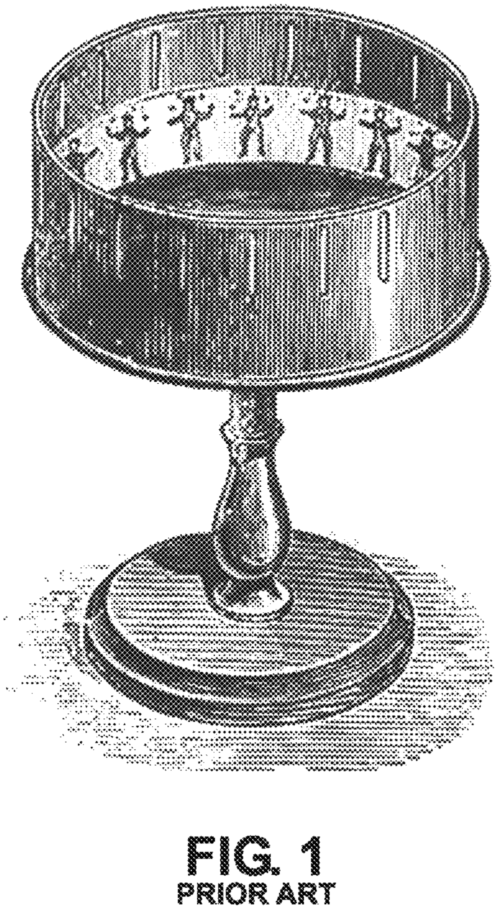
FIG. 1 is a perspective view of a zoetrope according to the prior art.
Figure 2:
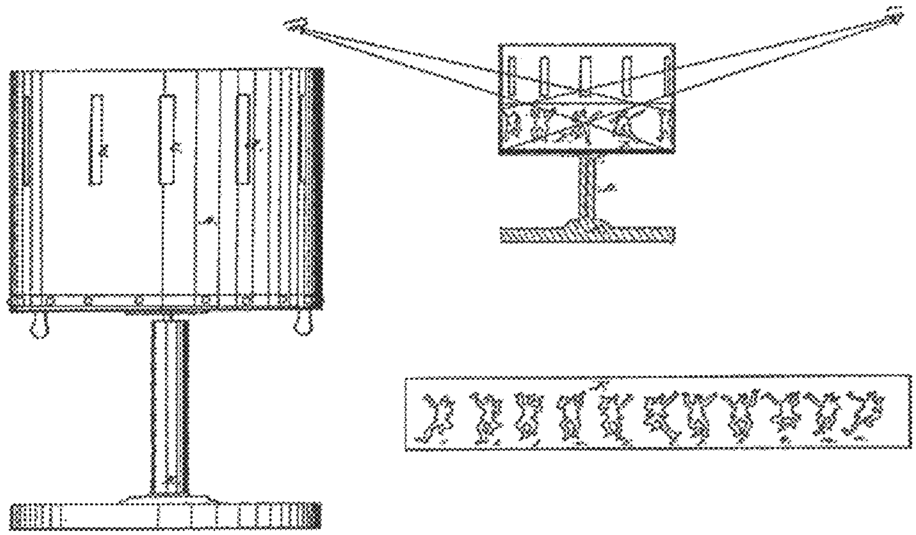
FIG. 2 comprises views in front elevation and cross section of a zoetrope according to the prior art.
Figure 3:
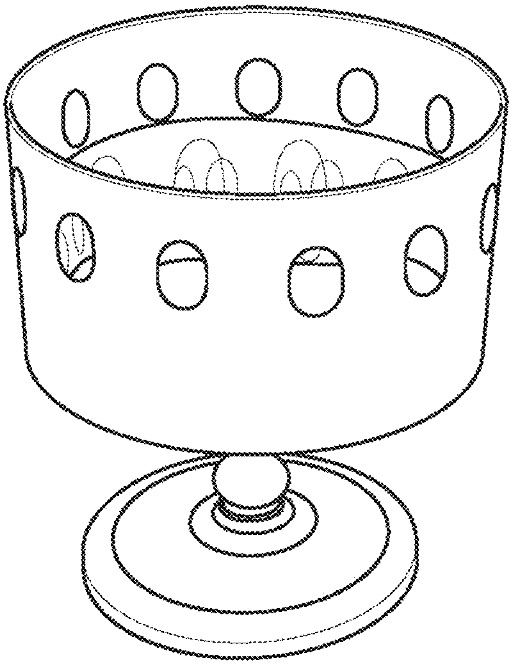
FIG. 3 is a perspective view of a further zoetrope according to the prior art.
Figure 4:
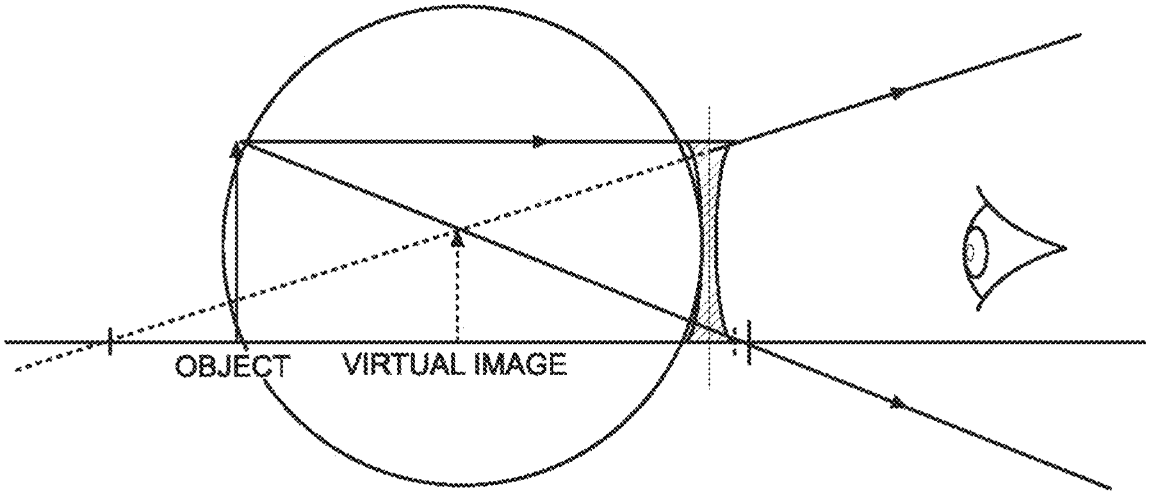
FIG. 4 is a schematic view of the optical paths during animation of the zoetrope of FIG. 3.
Figure 5:
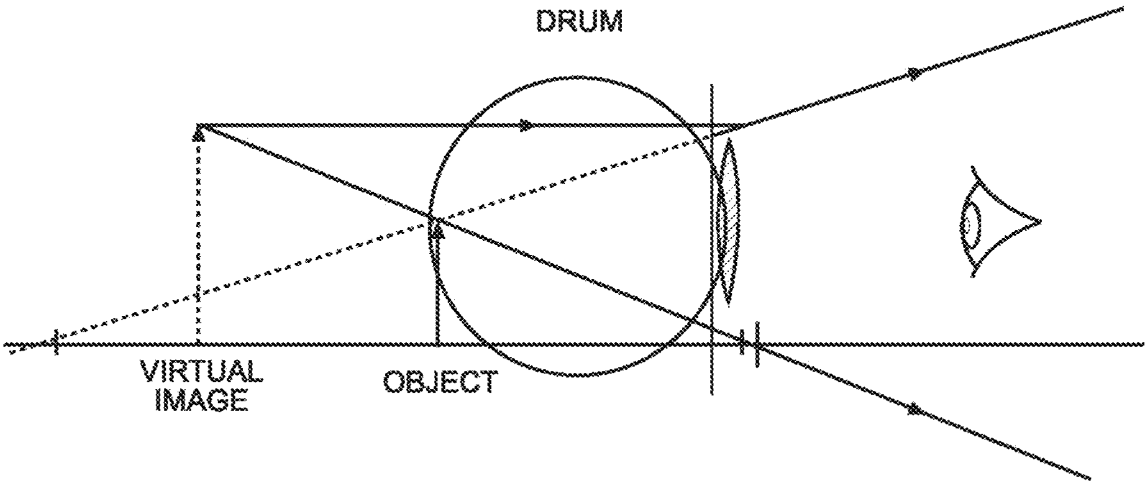
FIG. 5 is a schematic view of the optical paths during animation of the zoetrope of FIG. 3 but with convex lenses.
Figure 6:
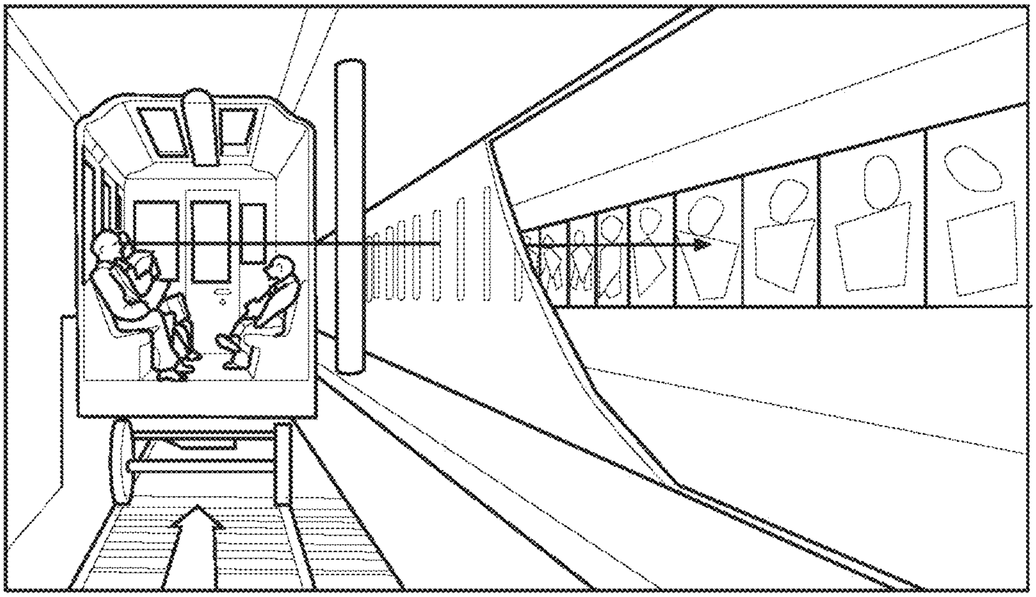
FIG. 6 is an alternative zoetrope as disclosed by the prior art.
Figure 7:
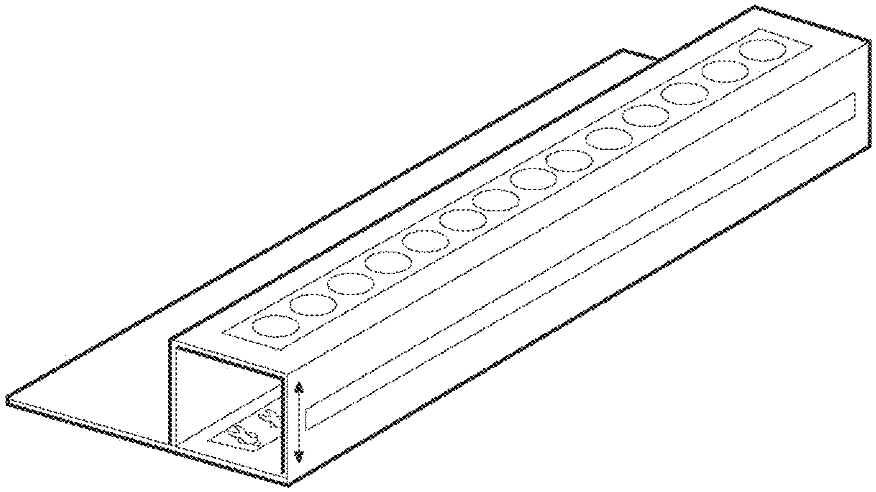
FIG. 7 is a perspective view of a linear zoetrope according to the prior art.
Figure 8:
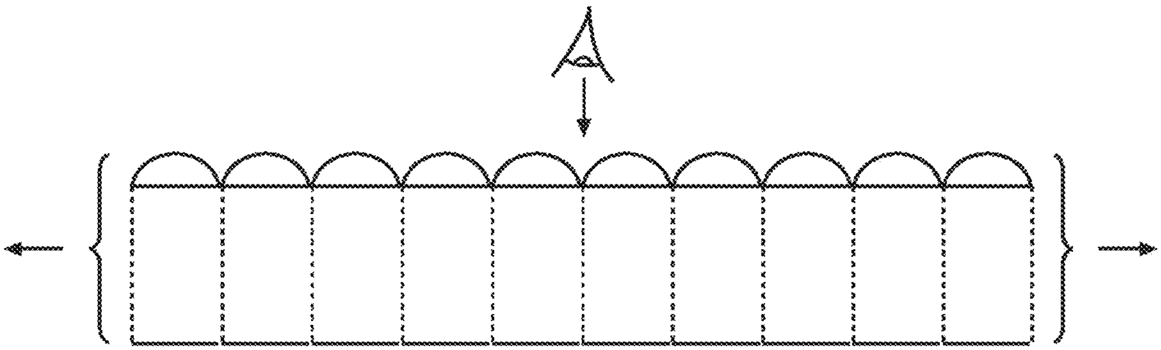
FIG. 8 is a view in font elevation of the linear zoetrope of FIG. 7.
Figure 9:
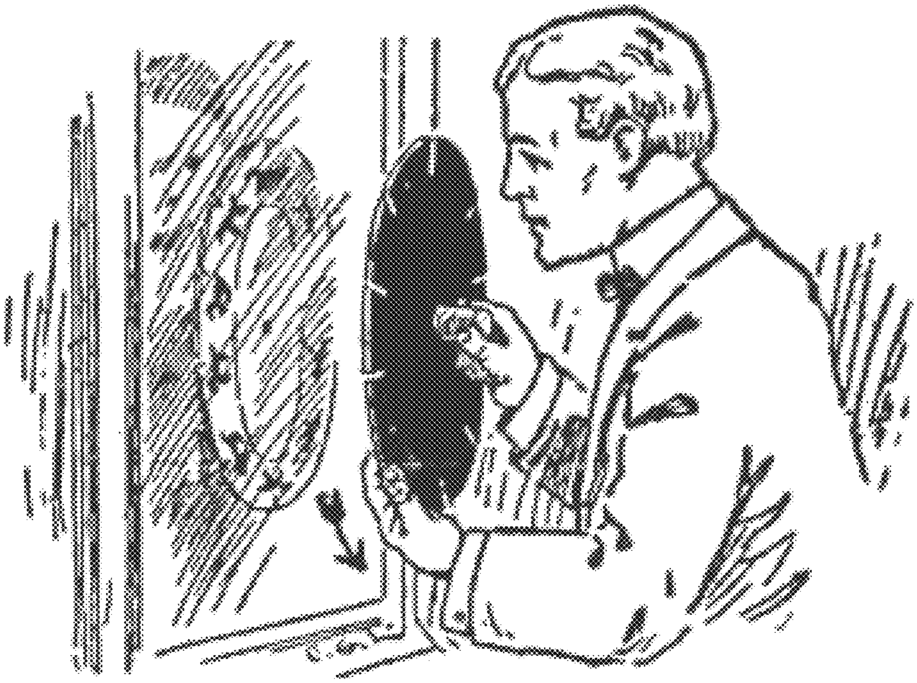
FIG. 9 is a perspective view of a phenakistoscope according to the prior art in use.
Figure 10:
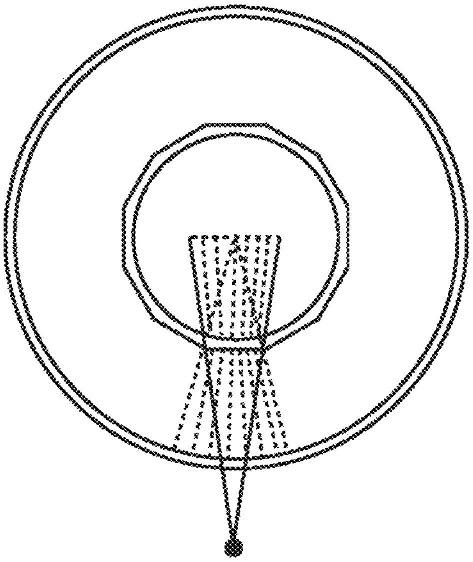
FIG. 10 is a top plan view of a praxinoscope according to the prior art.
Figure 11:
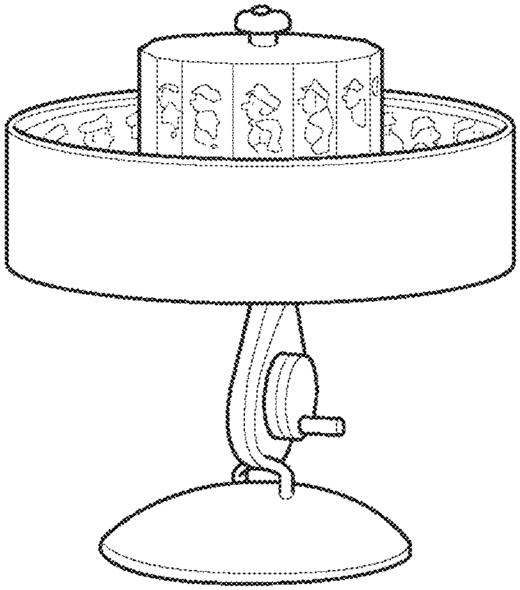
FIG. 11 is a perspective view of the praxinoscope of FIG. 10.
Figure 12:
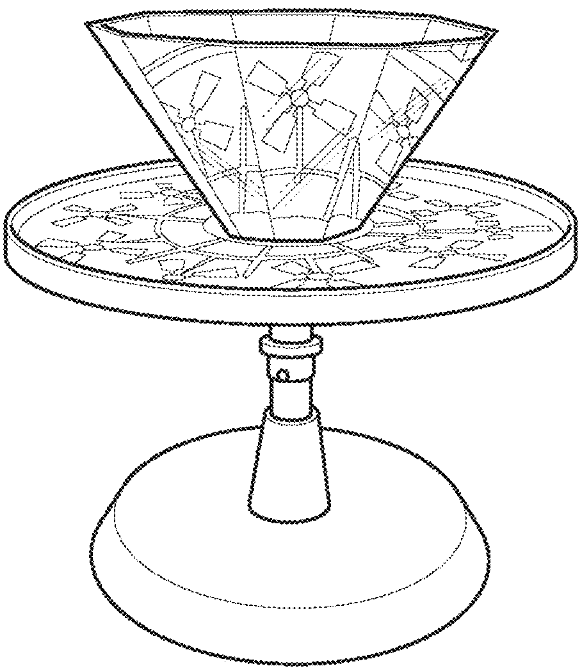
FIG. 12 is a perspective view of a modified praxinoscope according to the prior art.
Figure 13:
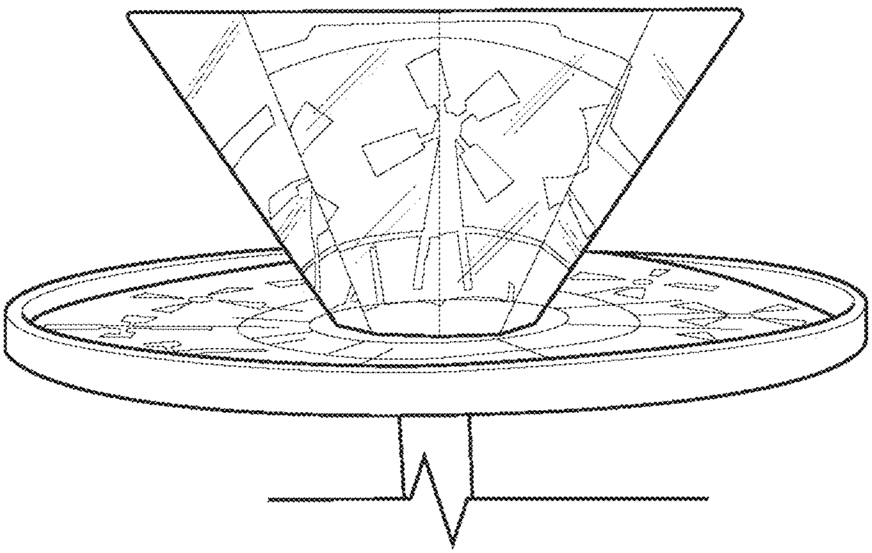
FIG. 13 is an amplified view of the praxinoscope of FIG. 12.
Figure 14:
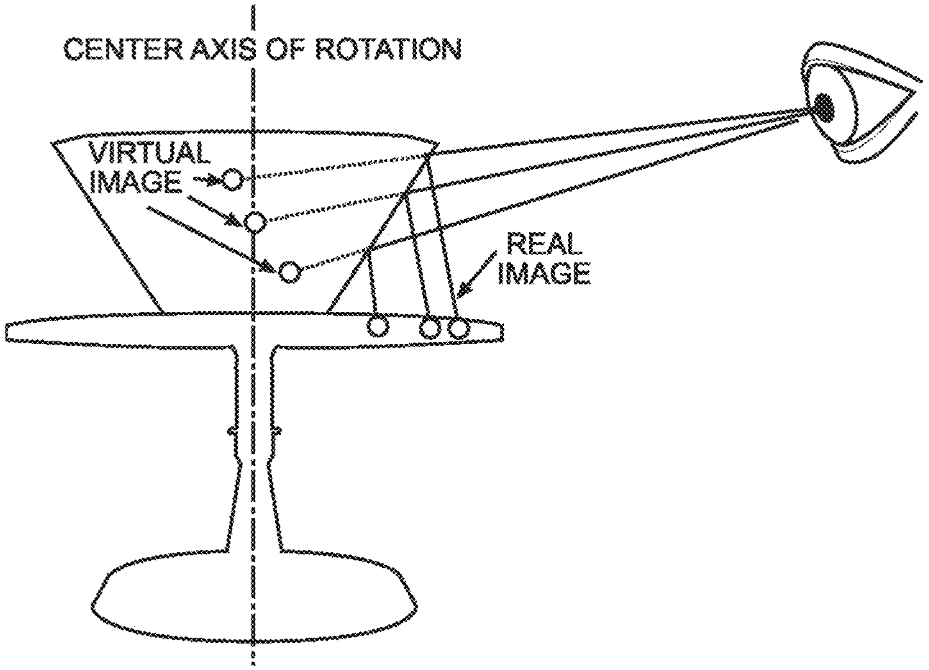
FIG. 14 is a schematic view of the optical paths during animation of the praxinoscope of FIGS. 12 and 13.
Figure 15:
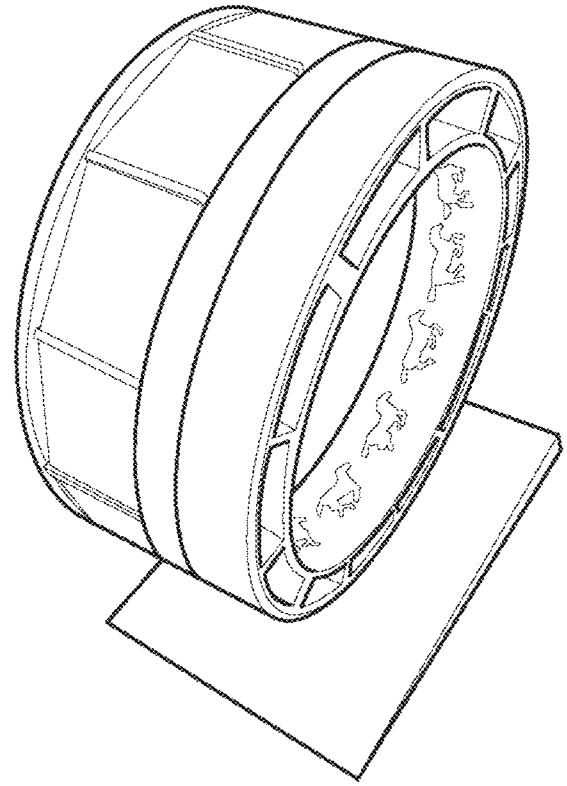
FIG. 15 is a perspective view of a sunlight-illuminated zoetrope devised by the present inventor.
Figure 16A:
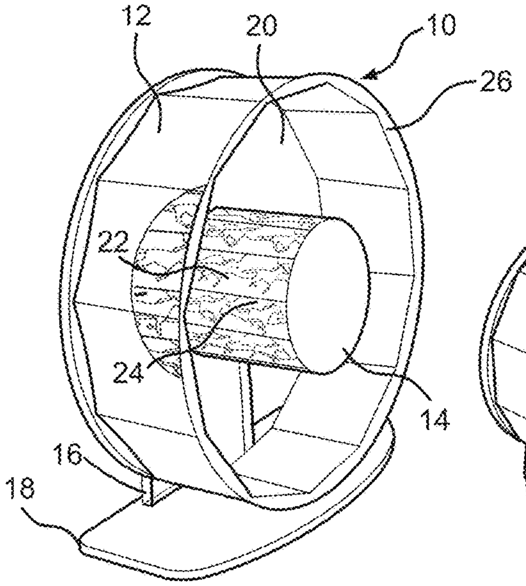
FIGS. 16A through 16D are perspective views of convex-lensed zoetropes according to the present invention.
Figure 16B:
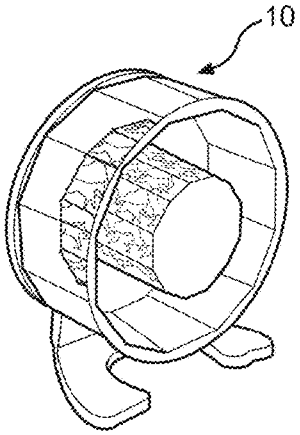
Figure 16C:
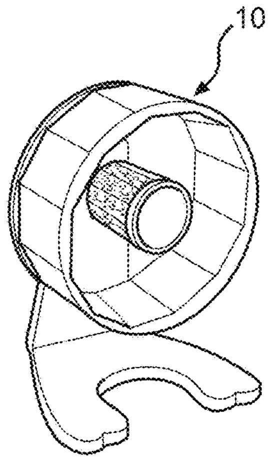
Figure 16D:
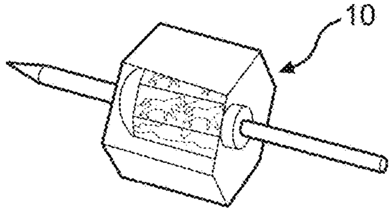

The convex-lensed zoetrope disclosed herein is subject to a wide variety of embodiments, each within the scope of the invention. To ensure that one skilled in the art will fully understand and, in appropriate cases, be able to practice the present invention, certain preferred embodiments and aspects of the zoetrope are described below and shown in the accompanying drawing figures. It will be understood, however, that the disclosed embodiments of the zoetrope are mere examples thereof and should not be considered to be limiting in any manner.

Looking more particularly to the drawings, a series of differently-sized embodiments of the present invention for a convex-lensed zoetrope are each indicated generally at 10 in FIGS. 16A through 16D. It will be observed that the convex-lensed zoetrope 10 bears similarities in overall shape to the zoetropes of the prior art, and it is likewise rotated about an axis to deliver an animation effect. However, as shown and described herein, the convex-lensed zoetrope 10 bears fundamental differences in structure and function from traditional zoetropes. Most importantly, the zoetrope 10 disclosed herein achieves the critical performance benefits of displaying animation that is bright, sharp, non-distorted, and unobstructed that can be viewed in a direct, straight-on manner without a need to be viewed, for example, through narrow slots or at compromising angles.

The convex-lensed zoetrope 10 has an annular outer drum 12 that is entirely or at least partially transparent. A plurality of lenses 26 are retained in series spanning the circumference of the outer drum 12. An inner image hub 14 is retained for concentric rotation with the outer drum 12. In this example, the image hub 14 and the outer drum 12 are supported by a support arm 16 that is in turn supported by a support base 18. In the depicted embodiments, the image hub 14 and the outer drum 12 are retained to rotate together by a base wall 20, but numerous other structures, including spokes, arms, and other structures for retaining the image hub 14 and the outer drum 12 to rotate together in a concentric fashion are possible and within the scope of the invention. The base wall 20 is transparent to allow as much ambient light as possible to enter the zoetrope 10, and the outer drum 12 is open without a wall, spokes, or other obstruction to allow access to the inner volume within the zoetrope 10, such as for inserting and removing animation members 22 as discussed further below and again to allow the entry of ambient light. Of course, it is possible to enclose the inner volume of the outer drum 12, such as with a second wall or spokes, as might be practical in a small child's rolling toy embodiment of the zoetrope 10 or another embodiment where an animation member 22 is expected to be fixed in place without a need for being removed and replaced.

In the convex-lensed zoetropes 10 of FIGS. 16A through 16D, the outer drum 12 and the image hub 14 are retained to rotate about a horizontal rotational axis. However, as further shown and described herein, embodiments are possible and within the scope of the invention in which the outer drum 12 and the image hub 14 rotate about an axis that is otherwise oriented, such as vertically, with the identical result of sharp, bright, directly viewable animation.

Together, the transparent outer drum 12, the inner annular image hub 14, and the base wall 20 can be considered to form a rotating structure. The rotating structure formed by the transparent outer drum 12, the inner annular image hub 14, and the base wall 20 can be retained for rotation in any effective manner, including by a simple spindle, a ball bearing rotational axis, or any other rotational support. In certain embodiments, the outer drum 12, the inner annular image hub 14, and, additionally or alternatively, the base wall 20 can be weighted, such as by ballast added thereto, for increasing rotational inertia and thus rotational spend time once the rotating structure has been induced into rotation, such as but not limited to by manual rotation by the user.

As shown and discussed further herein, an animation member 22, which could comprise an animation strip 22, an animation cylinder 22, an animation member 22 formed by a series of animation segments, or another animation member 22, is provided for being selectively applied to wrap circumferentially around the image hub 14 thereby to encircle the same. In the illustrated example, the animation member 22 comprises an animation strip 22. In other embodiments, the animation member 22 could be fixedly integrated onto the image hub 14. Plural images 24 are retained by the animation strip 22, such as by being printed thereon, applied or affixed thereto, or otherwise retained. The images 24 are disposed facing radially outwardly when the strip 22 is formed into a cylinder. The number of images 24 on the animation strip 22 will preferably correspond to the number of lenses 26 in the lens structure 28, and the images 24 and the lenses 26 will preferably be aligned with one another to produce optimal animation when the animation member 22 is applied to the image hub 14 within the outer hub 12 and the lens structure 28.

Two aspects of the depicted embodiments of the zoetrope 10 are interdependently operative in delivering the desired animation. Regarding the first aspect, one will recall that the image strip in Horner's zoetrope was viewed as positioned against the interior wall of a drum shell, and this image placement was perpetuated by Maxwell and then again by Reynaud with the praxinoscope. By contrast, the present invention disposes the animation strip 22 in a position wrapped around the cylindrical image hub 14, which is permanently fixed to rotate with the outer drum 12, in this embodiment by the base wall 20. Thus, the images 24 are now physically located much closer to the observer's eye than they would otherwise be in prior art structures, including those of Maxwell and Horner. Regarding the second aspect, one will further recall Maxwell's teaching of a concave-lensed zoetrope and the following of that paradigm by subsequent inventors.

Under the present invention, however, plural convex lenses 26 are disposed in series circumferentially spaced along the circumference of the outer drum 12. While glass convex lenses 26 can be employed in practices of the zoetrope 10, it has presently been found preferable to incorporate thin, lightweight, flexible plastic Fresnel convex lenses 26, similar to those commonly referred to as "credit card magnifiers" or "bookmark magnifiers." As such, manifestations of the lenses 26 have a first, flat face and a second face embossed, molded, or otherwise formed to have a Fresnel architecture. A non-limiting example of a Fresnel lens is illustrated in FIG. 17 compared to a typical simple lens.

Figure 17:
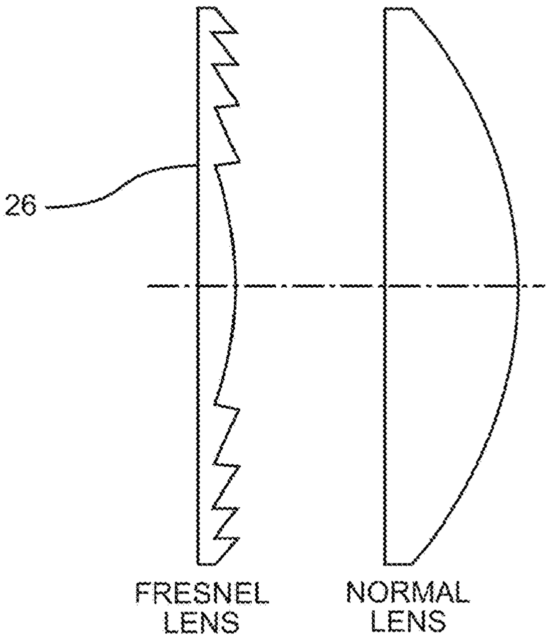
FIG. 17 is a cross-sectioned view in side elevation comparing a Fresnel lens with a simple lens.

Fresnel magnifying lenses 26 similar that depicted in FIG. 17 may be referred to as "3×" lenses, commonly employed as credit card-size lenses, or "2×" lenses, commonly employed as larger, book page-size lenses. Both are readily available on the market at an extremely low cost compared to glass or other plastic lenses. While higher magnification Fresnel lenses all the way up to "10×" can be found and purchased, they are not presently considered practical for use in embodiments of the present invention due to their small size and their distortive, "coke bottle" effect in which the magnified image seen through them appears to be surrounded by visual incoherence. With some exceptions, it is, therefore, generally preferable to employ either 2× or 3× Fresnel lenses 26 for the display of animations of appreciable size.

Figure 18:
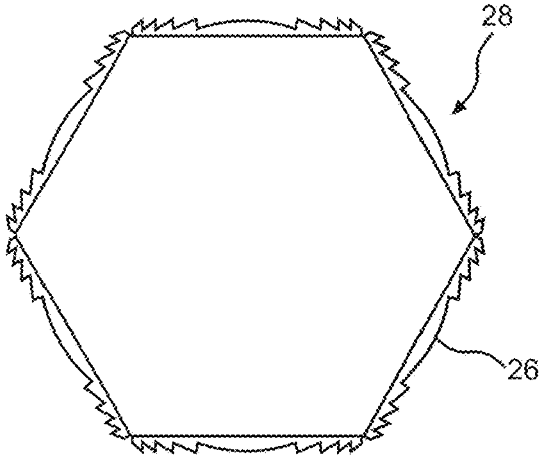
FIG. 18 is a view in side elevation of a polygonal ring-shaped lens structure according to the present invention.
Figure 19:
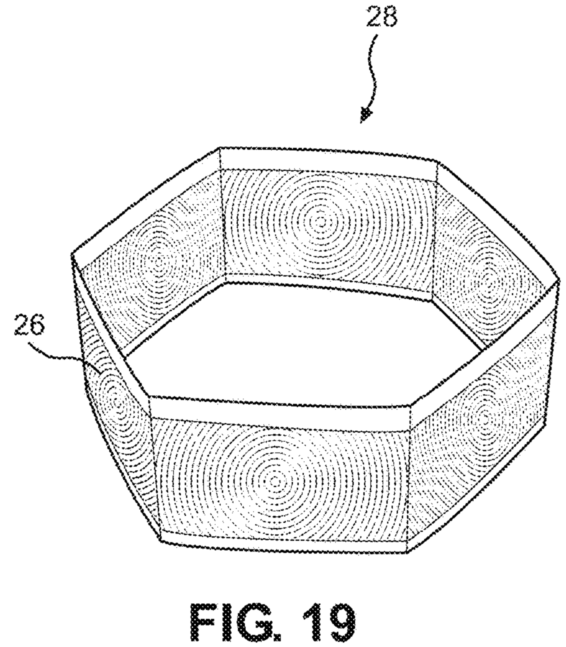
FIG. 19 is a perspective view of the polygonal ring-shaped lens structure of FIG. 18.

Any reasonable number of lenses 26 may be employed in the zoetrope 10. In the creation of certain embodiments of the zoetrope 10, six Fresnel lenses 26 were employed after first being trimmed into rectangular shapes. Then, they were joined end-to-end with the embossed side out to form a polygonal, ring-shape lens structure 28 as depicted in the non-limiting examples of FIGS. 18 and 19. There, six lenses 26 are used to form a hexagonal lens structure 28. Of course, other numbers of lenses 26 and other methods for forming the lens structure 28 would be readily possible and within the scope of the invention.

Figure 20:
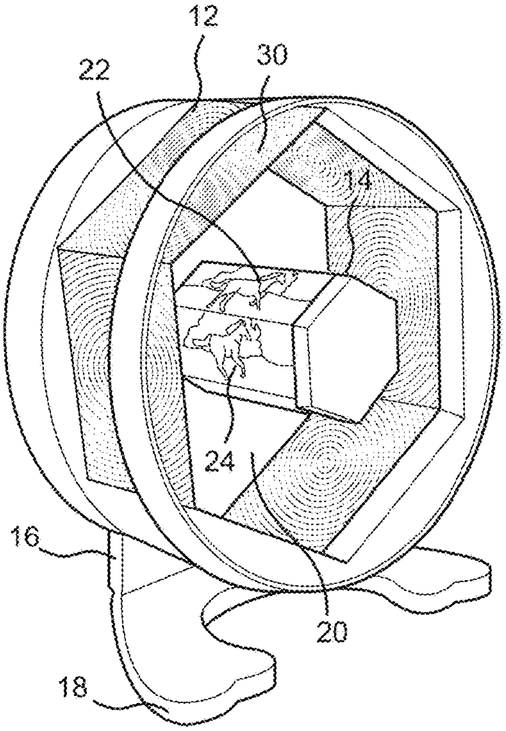
FIG. 20 is a perspective view of a convex-lensed zoetrope according to the present invention with a polygonal ring-shaped lens structure disposed within a transparent outer drum and a rigid polygonal framework.

The lens structure 28 so formed can then be fixed within a rigid polygonal framework 30 or within an annular outer drum 12 of transparent material, such as clear acrylic plastic, as shown previously. Alternatively, the lens structure 28 can be fixed within both a transparent outer drum 12 and a rigid polygonal framework 30 as shown in FIG. 20.

Figure 21:
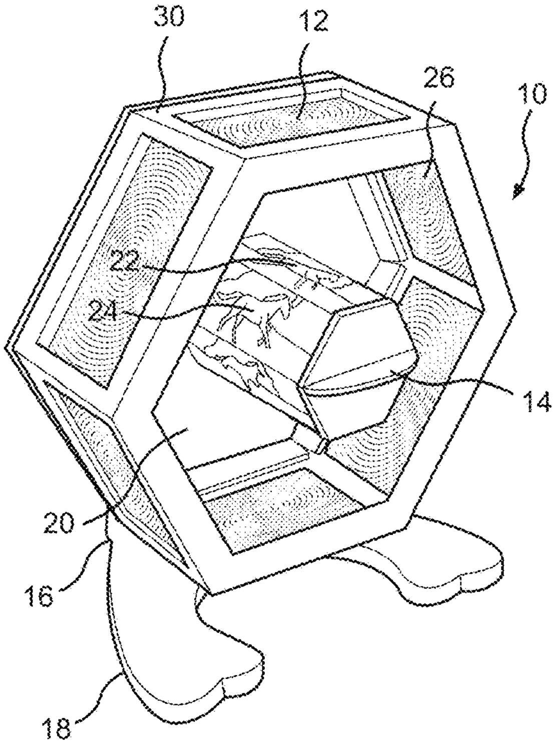
FIG. 21 is a perspective view of a convex-lensed zoetrope according to the present invention with a polygonal ring-shaped lens structure disposed within a rigid polygonal framework.

In preferred embodiments, the trailing edge of each lens 26 will cleanly abut the leading edge of its immediately adjacent trailing lens 26 to eliminate unnecessary interruption of the otherwise seamless animation effect sought to be achieved. This inventor has found that any separation between lenses, whether the separation is thick, thin, light, dark, opaque, or even transparent, can compromise the clarity of the animation effect. For instance, constructions as in FIG. 21 where frame sections are interposed between adjacent lenses 26, thus interrupting the animation effect, are preferably avoided.

However, in view of the flexibility of such Fresnel lenses 26, the lens structure 28 configuration itself may pursue a shape other than polygonal. It can instead be made to conform partially or entirely to the inner curvature of the transparent, rigid cylindrical outer drum 12 previously shown and described. Perhaps surprisingly, it has been found that the optical performance of the zoetrope 10 is not compromised by such curving of the lenses 26. Indeed, the inventor has found that it may even be marginally improved. To be complete, it is noted that it is within the scope of the invention for, among other combinations, a cylindrical array of lenses 26 to be paired with a cylindrical or polygonal image hub 14 and for a polygonal array of lenses 26 to be paired with a polygonal or cylindrical image hub 14 with little or no appreciable difference in the improved animation provided by the zoetrope 10 as compared to devices of the prior art.

Figure 22:
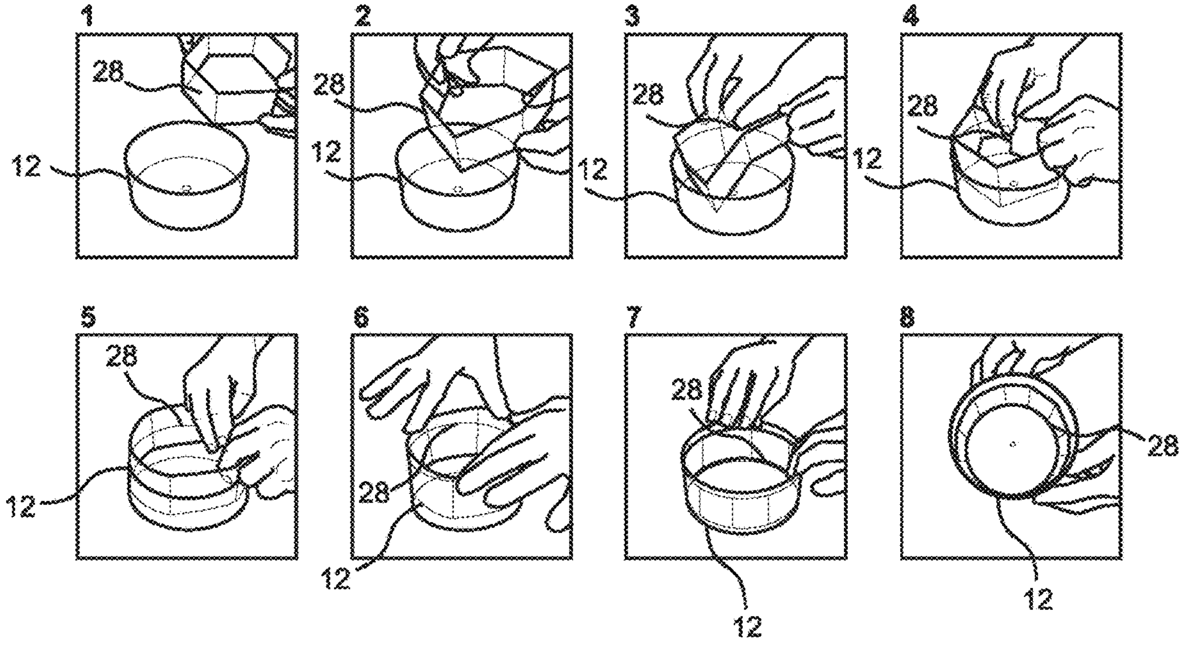
FIG. 22 comprises a series of perspective views depicting the assembly of a polygonal ring-shaped lens structure with a transparent drum shell according to the present invention.

As formed by the inventor following the steps illustrated in FIG. 22, the lenses 26 were first trimmed to the appropriate size to cause the circumference of the circle along which their meeting ends are disposed when assembled as the lens structure 28 to match the inner circumference of the outer drum 12 exactly. The lenses 26 were then joined together at their ends, such as with a transparent tape or other transparent adhering material to form the lens structure 28. The lens structure 28 is then partly compressed, such as by being folded in upon itself, fitted inside the shell of the outer drum 12 and unfolded, or "popped out," causing the lens structure 28 to press outwardly against and thus conform at least partially to the cylindrical inner surface of the outer drum 12. Where necessary or desirable, the lens structure 28 can be permanently affixed to the outer drum 12, such as by contact cement or another adhesive applied to the edges of the lenses 26 or by some other method for adhering or retaining. Where adhesive is employed with Fresnel lenses 26, it has been found to be important to avoid applying adhesive directly to the embossed sides of the lenses 26 as doing so can comprise the optical properties of the lenses 26. However, it has been found that the pressure of the lens structure 28 pressing against the inside of the drum 12 may be sufficient to hold the lens structure 28 firmly in place without adhesive.

Figure 49:
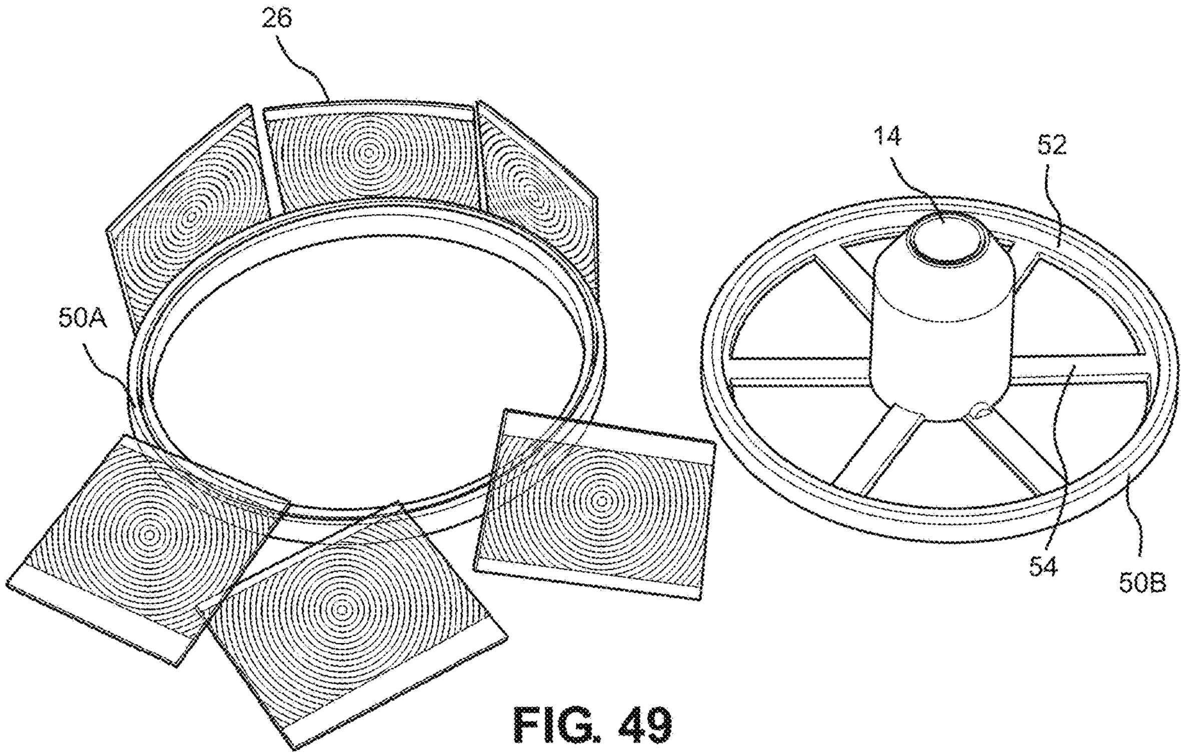
FIG. 49 is a disassembled perspective view of components for forming a lens structure and outer drum.
Figure 50:
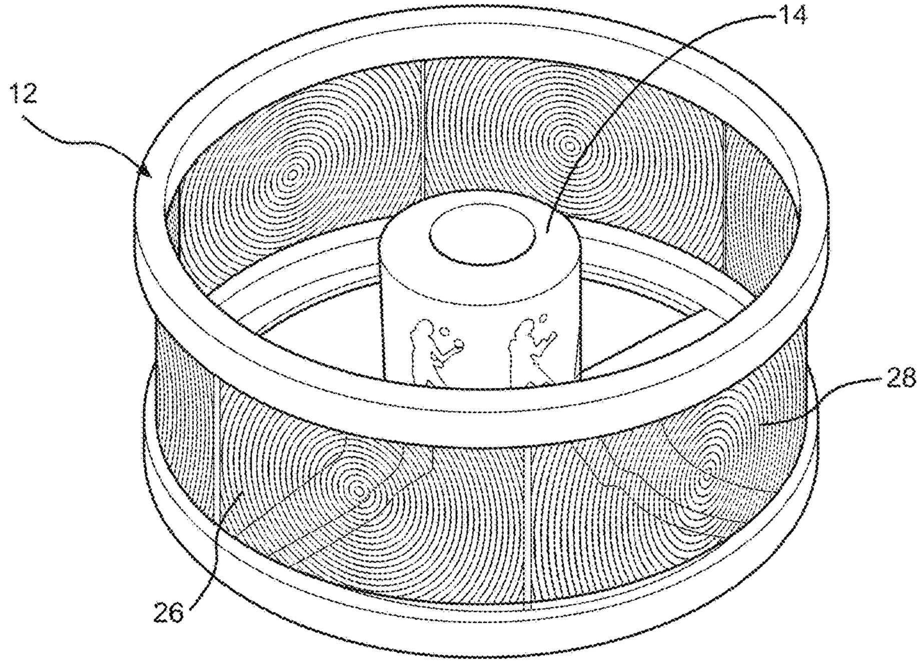
FIG. 50 is a perspective view of the lens structure and outer drum formed from the components of FIG. 48.

Other methods for fixing the lenses 26 in place may be employed within the scope of the invention. For instance, the individual lenses 26 could be slidably received into pre-formed slots in the outer drum 12. Other receiving structures could be employed. Lenses 26 could also be friction or snap fit between evenly spaced retaining ridges or other formations that protrude from, for example, the inner surface of the outer drum 12. One alternative structure and method for disposing and retaining the lenses 26 in a lens structure 28 and for forming the outer drum 12 can be understood with additional reference to FIGS. 49 and 50. There, the outer drum 12 and the lens structure 28 are essentially unified with the lenses 26 and first and second drum retaining rings 50A and 50B cooperating to form the outer drum 12 and the lens structure 28. Each outer ring 50A and 50B has an annular peripheral groove 52, and the lenses 26 comprise flexible lens sheets 26. The second drum retaining ring 50B retains the image hub 14 concentrically therewith by use of evenly spaced spokes 54 with it again being understood that a transparent wall or other mechanism could be employed. Under this configuration, the lenses 26 and the retaining rims 50A and 50B can be assembled, such as by bowing the flexible lenses 26, inserting their edges into the groove 52 of one of the rims 50A or 50B, and then assembling that combined structure with the remaining rim 50A or 50B to form the unified lens structure 28 and outer drum 12 as illustrated in FIG. 50. The lenses 26 and rims 50A and 50B can be secured together in any appropriate manner, including adhesive, fasteners, a friction fit, or any other method or combination thereof.

Figure 23:
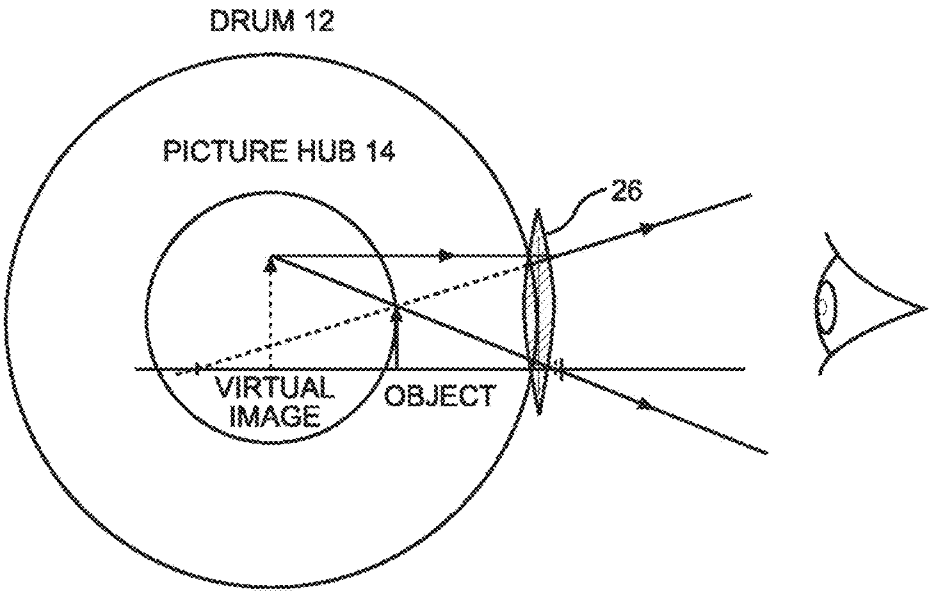
FIG. 23 is a schematic view of the optical paths during animation of the convex-lensed zoetrope disclosed herein.
Figure 24:
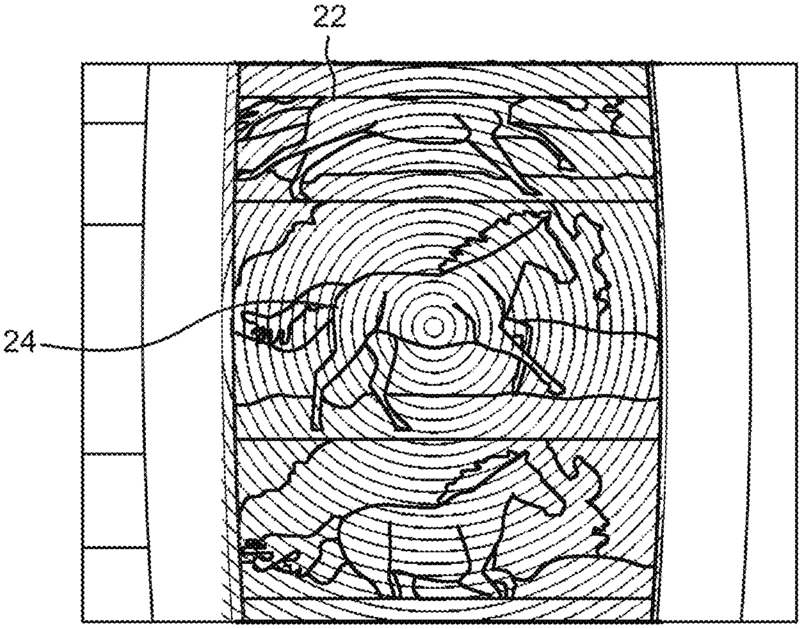
FIG. 24 is a view in front elevation of a portion of the convex-lensed zoetrope depicting the head-on viewing of a displayed animating image.

While Maxwell's concave lenses serve to advance or bring forward and visually transform far-away, real images into central-axis-located virtual images, the convex lenses 26 in the present invention accomplish the opposite. Instead of bringing forward a real image from far away, they instead visually "push away" a close-up image 24. As such, the lenses 26 operate to locate the perceived virtual image at the same desired central-axis of rotation. However, while the perceived virtual images in Maxwell's concave lensed zoetrope are significantly reduced in size compared to the original real images, the virtual images displayed by the present invention are instead significantly increased in size in comparison to the real images 24 on the image hub 14. Animation that is easily-viewable and of appreciable size is thus achieved. FIG. 23 illustrates this optical principle. Moreover, because there are no obscuring breaks or wall sections between the lenses 26, the displayed animating image is bright, sharp and undistorted and can be viewed in a direct, head-on manner as is depicted in FIG. 24, all in achievement of the goals of the invention and in a marked advance over the prior art.

Any reasonable number of lenses 26 can be employed in embodiments of the zoetrope 10. The number and angular disposition of lenses 26 will ideally correspond to the number and angular disposition of animation images 24 disposed on the animation strip 22 to be viewed. For example, if twelve lenses 26 are employed, the image hub 14 or the animation strip 22 applied thereto would feature twelve images 24. If six lenses 26 are employed, the image hub 14 or the animation strip 22 applied thereto would feature six drawings. In this regard, it is noteworthy that previous zoetropes typically featured animation strips with a great number of drawings, usually ten or more, because, the fewer the drawings, the more the proportion of black space between slots in the zoetrope and thus the darker the animation displayed. However, the zoetrope 10 disclosed herein is capable of delivering bright animations even when a small number, such as six images 24, are displayed. The choice of fewer images 24 may be advantageous to the viewing experience because, the fewer drawings on an animation strip 22, the bigger they are, and thus the more satisfying they are to view.

Figure 51:
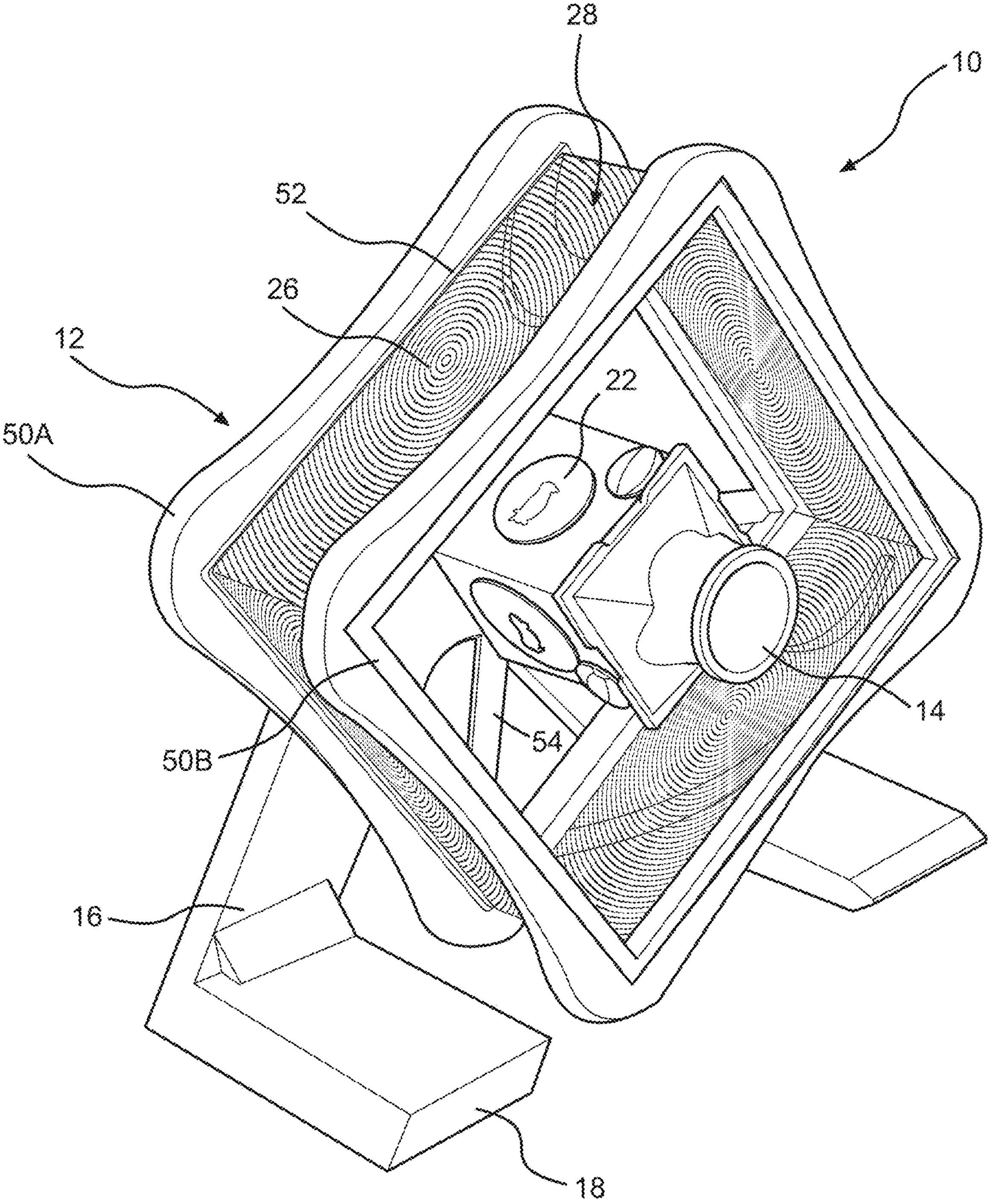
FIG. 51 is a perspective view of still another embodiment of the convex-lensed zoetrope.

In fact, the present inventor has devised of embodiments of the zoetrope 10 where convincing animation is achieved with just four phases of images 24. Such an embodiment is depicted in FIG. 51. There, the zoetrope 10 again employs first and second retaining rims 50A and 50B, each with a receiving groove or grooves 52, to retain plural lenses 26 such that the lenses 26 and the rims 50A and 50B together form both the outer drum 12 and the lens structure 28. The first rim 50A has plural spokes 54 that concentrically retain the image hub 14. In the present embodiment, however, the rims 50A and 50B are rectangular such that four lenses 26 can be retained in flat configurations to form a rectangular lens structure 28. The image hub 14 has four faces disposed in a rectangular shape. Moreover, the image hub 14 and the animation members 22 in this embodiment are magnetized such that the animation members 22 can be readily removed, replaced, and repositioned relative to the image hub 14. This demonstrated ability to animate clearly and brightly with just four image phases 24 further differentiates embodiments of the present invention from those of the prior art.

It will be observed that the concave lenses in Maxwell's zoetrope were specifically required to have a focal length equaling the exact diameter of the cylinder, thus locating the virtual image to be observed exactly at the central axis, to momentarily give the appearance of each drawing "stopping". Under the present invention, however, because convex lenses 26 and a central image hub 14 are instead employed, virtually any diameter outer drum 12 can be made to work with any power of convex lenses 26, whether they be simple or Fresnel lenses 26, provided that the diameter of the image hub 14 is tailored to that particular zoetrope 10.

To determine the preferred diameter of the image hub 14 for a given convex-lenses zoetrope 10, one must first find the distance between the lens 26 and the image 24 (i.e., the real image or "object"). This can be mathematically calculated according to Formula 1 as follows: Distance between lens 26 and the real image (o)=1/(1/focal length+1/virtual image distance)

$$o = \frac{1}{\frac{1}{i} + \frac{1}{f}} \qquad \text{Formula 1}$$

$o$ = object distance $i$ = virtual image distance $f$ = focal distance of lens

As an illustrative example, one may consider six 3× lenses in a hexagonal configuration within a 5.25" diameter outer drum 12. One can then measure the distance between the centers of any two opposite lenses arranged inside the drum 12. That distance would be found to be 4.5 inches. By dividing that in half, one can determine the exact center of the drum 12 to be 2.25 inches from the lenses. This 2.25 inch distance will be noted as "i", the virtual image distance. Meanwhile, it is known that an accurate 3× lens has a focal length of 5.75 inches, which will be denoted as "f". Using Formula 1 above, one can calculate that "o," the distance from the lens 26 to the image 24 (i.e., the real image or "object") is 1.62 inches. One can then determine the proper radius of the image hub 14 by subtracting "o" (1.62 inches) from "I" (2.25 inches), which gives the radius of the image hub as 0.63 inches. That radius is then doubled to give the proper diameter of the image hub 14 as 1.26 inches.

While the exquisite beauty and perfection of optical calculations cannot be assailed, the result above takes for granted that the 3× lenses 26 are exactly that. However, the inventor has found that the purportedly "3×" credit card-type Fresnel lenses 26 readily available commercially are, in fact, typically not true 3× lenses at all. Many have focal lengths that vary dramatically from manufacturer to manufacturer or even batch to batch from a single manufacturer.

Figure 25:
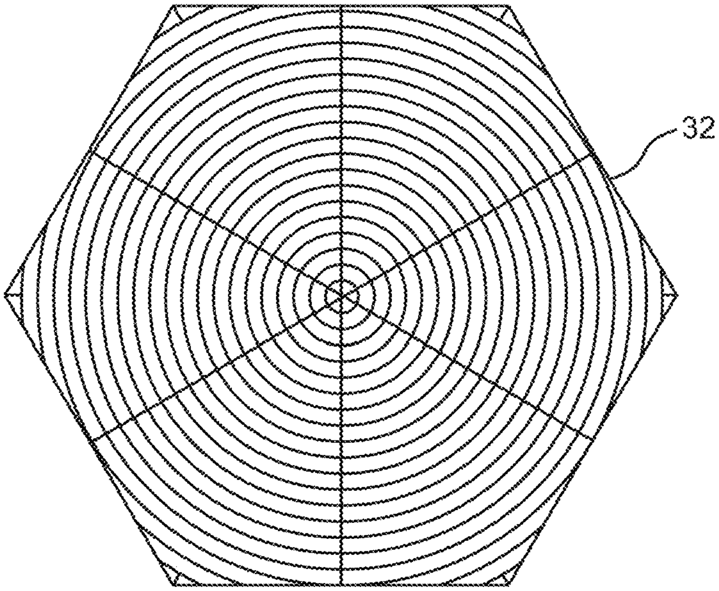
FIG. 25 is a top plan view of a target template for determining an optimal image hub diameter according to the disclosed invention.

Therefore, the present inventor has devised of a more direct way of determining the proper image hub diameter when employing off-the-shelf Fresnel "credit card" type lenses 26 in practices of the invention. To illustrate, one may again refer to the previous example of a 5.25" diameter outer drum 12 fitted with six off-the-shelf "3×" lenses 26 arranged in a hexagonal formation. First and with reference to FIG. 25, a cardstock target template 32 was prepared by the application of the same number of lines as lenses 26, six in this instance, radiating outward from the center of the template 32. Also applied were a quantity of concentric closely-spaced circles, such as circles with diameters increasing progressively to cause the lines defining the same to be spaced by ⅛ inch, concentric with the center of the template 32. The circles span from proximal to the center of the template 32 outwardly to its perimeter. The radiating lines can be printed in black. The concentric circles are ideally printed in different colors, such as red, green and blue, repeated with each concentric sequence of circles.

Figure 26A:
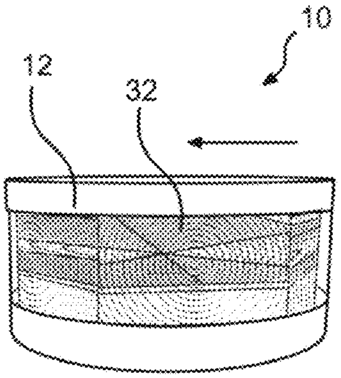
FIGS. 26A, 26B, and 26C are perspective views of the target template of FIG. 25 disposed within an outer drum according to the invention during a rotation thereof.
Figure 26B:
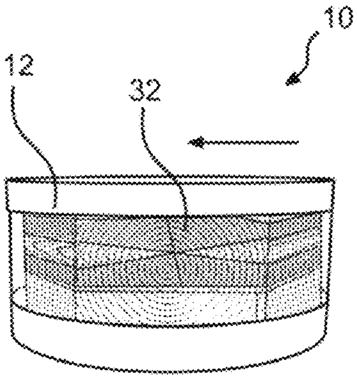
Figure 26C:
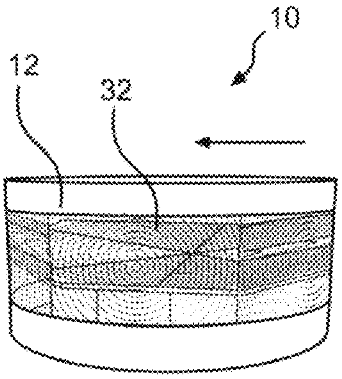
Figure 27:
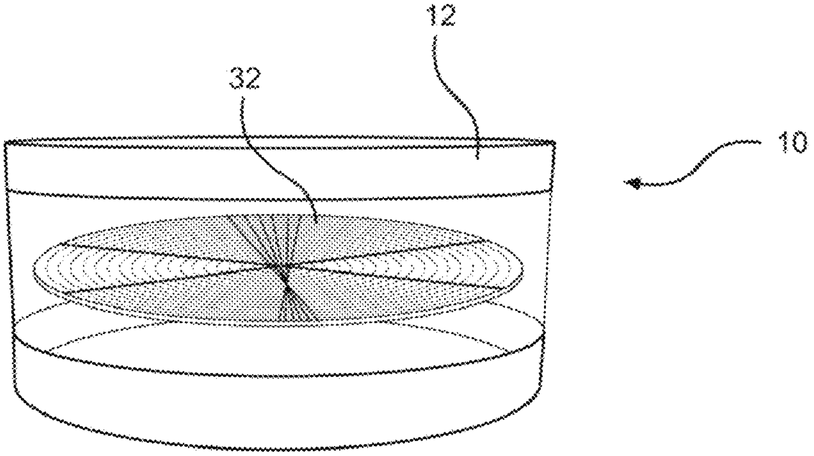
FIG. 27 is a perspective view of the target template disposed within the outer drum according to the invention during a rotation thereof with the vertical center axis of the drum indicated by a virtual "X" provided by the target template.

The target template 32 so formed is then cut to fit comfortably within the surrounding lens structure 28 and positioned within the drum 12 at such a distance from the base wall 20 that the outer edge of the template 32 effectively bisects the surrounding lenses 26, with each radiating line extending to the center of a given lens 26. One can then, with one eye, observe the target template 32 through the lenses 26 while rotating the drum 12 slowly, such as from right to left in the depicted example. A surprising progressive parallax displacement of one of the radiating lines can then be seen. While the nearest end of the radiating line, the line directly behind the center of the lens 26, appears to sweep from right to left along with the rotating direction of the drum 12 as expected, the central point of the radiating line—that is, where it intersects the exact center of the target template 32—appears to sweep a short distance in the opposite direction—from left to right in this example. This suggests that there is a point somewhere between the line's close end and the target intersection that has "stopped" in place even though the drum 12 is rotating. This phenomenon is illustrated in FIG. 26. When the drum 12 is now rapidly spun in either direction, the repeating and progressively changing angle of the radiating lines creates a temporary, virtual superimposed "X" at that point. This virtual "X", which only exists when the lens structure 28 is rotating, indicates the virtual center axis of the drum 12. This can be perceived in FIG. 27.

Figure 28:
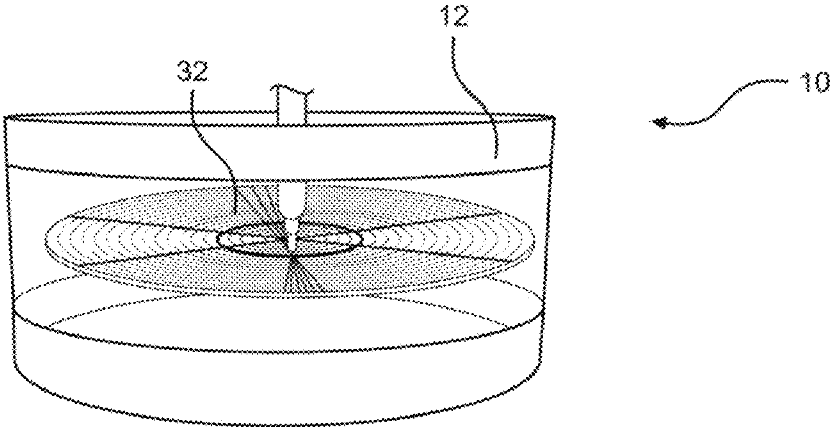
FIG. 28 is a perspective view of the target template disposed within the outer drum during a rotation thereof with a marking device applied thereto.
Figure 29:
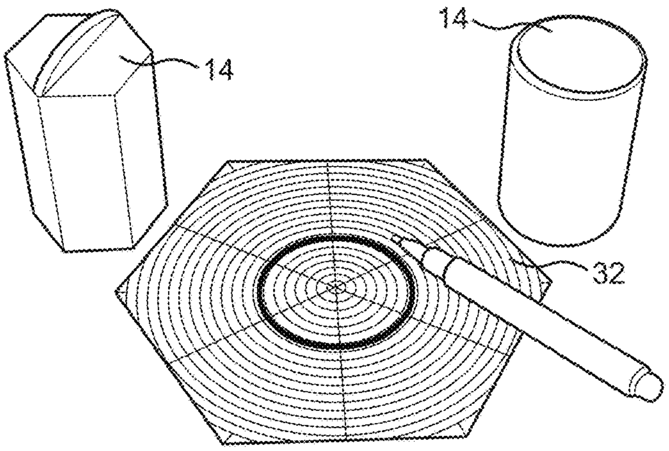
FIG. 29 is a perspective view of polygonal and cylindrical embodiments of the image hub in conjunction with a target template as taught herein.

The tip of a fine, preferably black, marking device can now be inserted into the spinning drum 12 to locate this exact point, and a circle can be scribed onto the still rotating target template 32. Because the spinning image is blurry, this location process is visually aided by the colored circles as FIG. 28 illustrates. The diameter of the scribed circle, which in this example came to be 1.625 inches, can now be used as a guide in the fabrication of an identical-diameter image hub 14. As FIG. 29 again illustrates, the image hub 14 could, by way of example and not limitation, be polygonal or cylindrical.

Notably, the 1.625" diameter image hub 14 determined using the above method is of a different diameter than the image hub 14 as calculated mathematically, which had a 1.26 inch diameter using a theoretically accurate 3× lens. Therefore, due to manufacturing variations in lenses 26, it would be reasonable to conclude that, for practical purposes, the inventor's hands-on method so described is more dependable than mathematical determinations when constructing an actual working model of the convex-lensed zoetrope 10, and it is particularly valuable in factory production where off-the-shelf lenses 26 are provided by a given vendor.

Figure 30A:
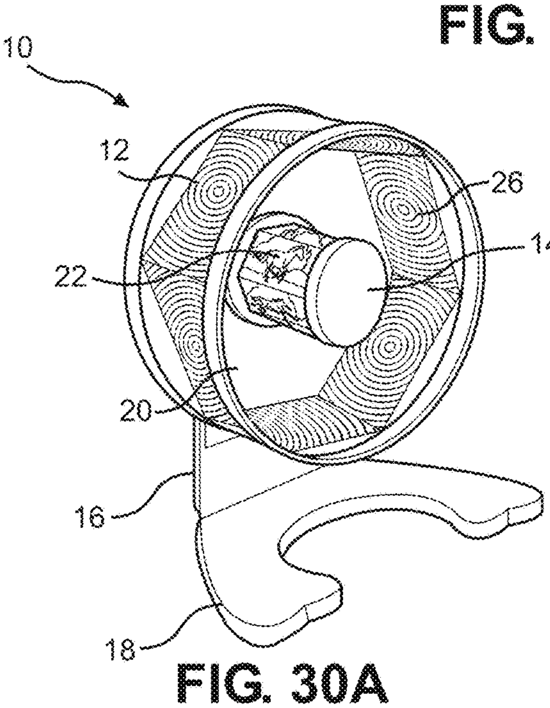
FIGS. 30A and 30B are perspective views of further embodiments of the convex-lensed zoetrope disclosed herein.
Figure 30B:
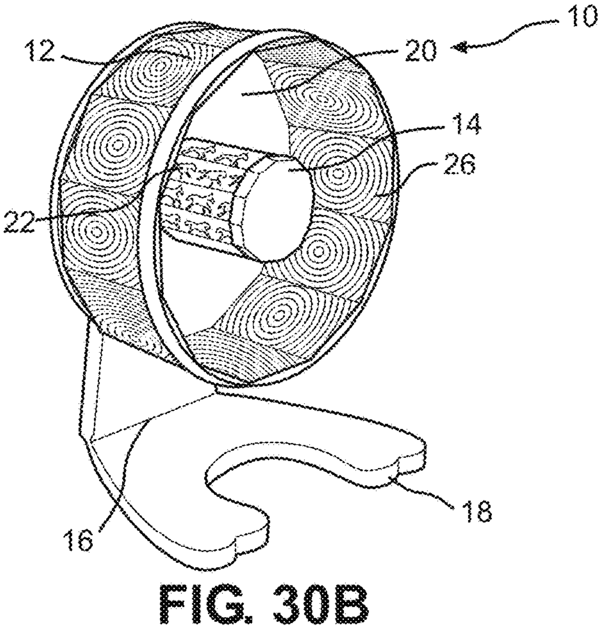

As FIGS. 30A and 30B illustrate, whether the zoetrope 10 has six lenses 26 as in FIG. 30A or more as in FIG. 30B, the diameter of the image hub 14 will remain essentially the same, provided that the diameter of the drum 12 and the power of the lenses 26 remain essentially the same as well.

Figure 31:
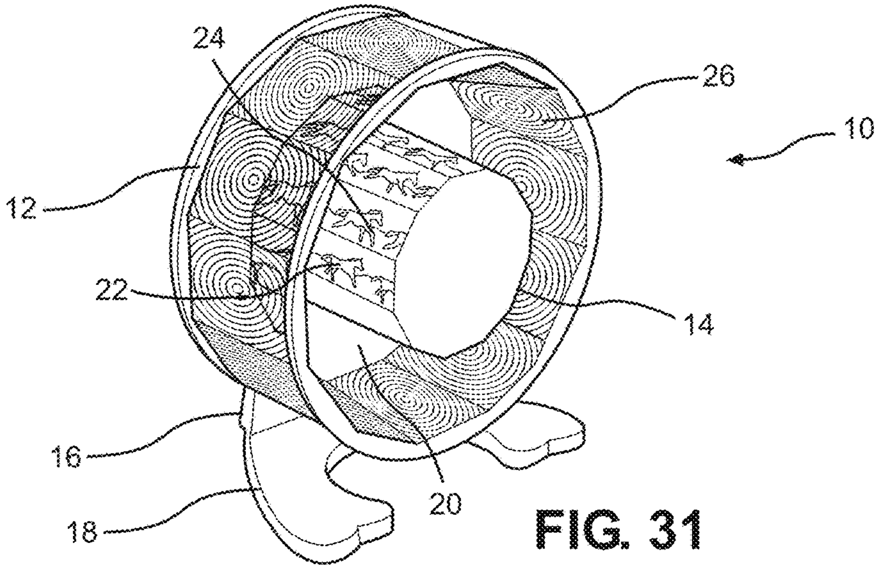
FIG. 31 is a perspective view of a convex-lensed zoetrope according to the invention with twelve double lens segments.
Figure 32:
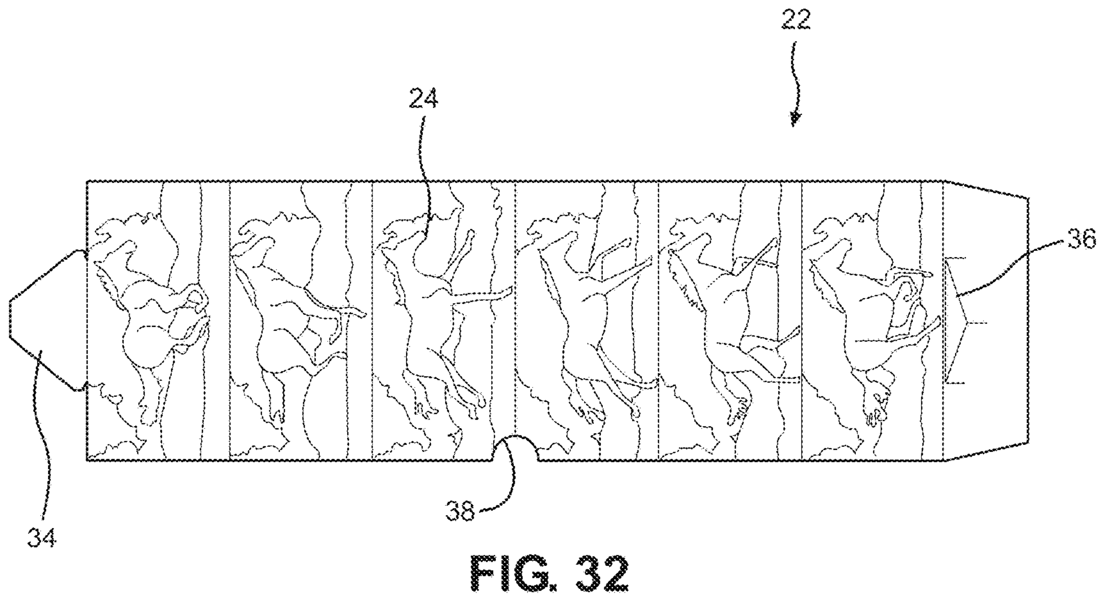
FIG. 32 is a top plan view of an animation strip for the convex-lensed zoetrope.

According to embodiments of the invention, the size of the virtual image may be increased further by "doubling-up" the lenses 26. This can be done, for example, by laminating two lenses 26 together with their smooth sides facing on other. Air and other optical distortions between the laminated lenses 26 are preferably avoided. Due to the increased magnification, an image hub 14 sized according to the hands-on method described above will be comparatively larger in proportion to the drum 12 than in the single lens 26 version. FIG. 31 depicts such a version of the convex-lensed zoetrope 10 where twelve double lenses 26 are employed. The comparatively increased diameter of the image hub 14 will be noted.

Because this doubling up of lenses 26 can result in the unwanted effect of reducing the contrast of the image being viewed, it is preferably applied only to larger versions of the convex-lensed zoetrope 10 in which the larger, less magnifying, readily-available "2×" Fresnel lenses 26 must be employed, and even then expressly for the purpose of enlarging the virtual image size to a more appreciable size. In any event, it has been found that, for a drum 12 of, for instance, a 12 inch diameter or larger, an animated image of satisfactory size is obtained without such doubling up as a result of the increased overall scale.

Figure 33:
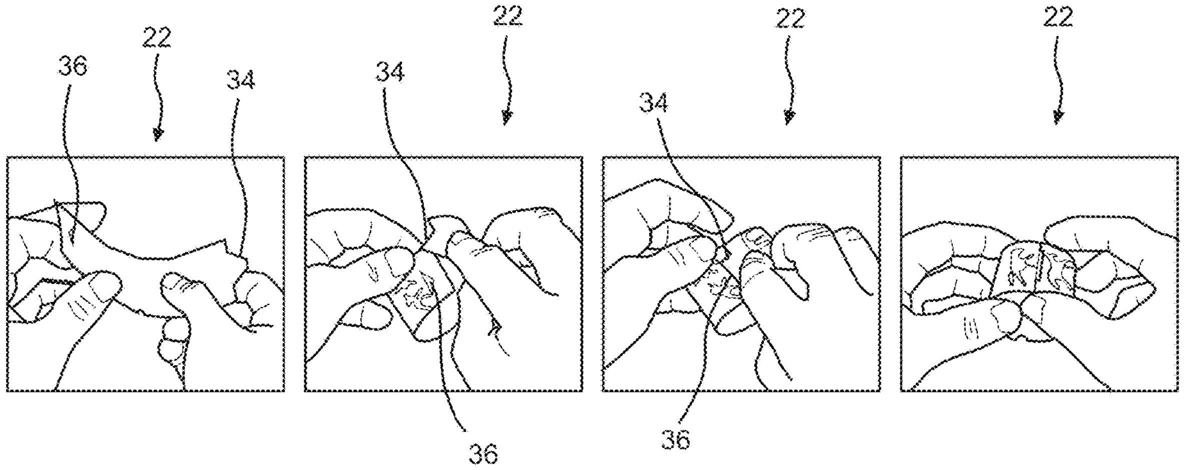
FIG. 33 comprises a series of perspective views depicting the formation of the animation strip into an animation cylinder.

Once the diameter of the image hub 14 is determined, its circumference can then be calculated to dictate the length of the animation strip or cylinder member 22 to be fitted around it. Using the previous example of a 1.625 inch diameter hub, an animation strip 22 or animation cylinder 22 would therefore be 5.1 inches long. As FIG. 33 illustrates, a tab 34 and a slot 36 may be added beyond the ends of the animation strip 22 to facilitate forming the strip 22 into a cylindrical shape to then be fitted onto the image hub 14.

Figure 52:
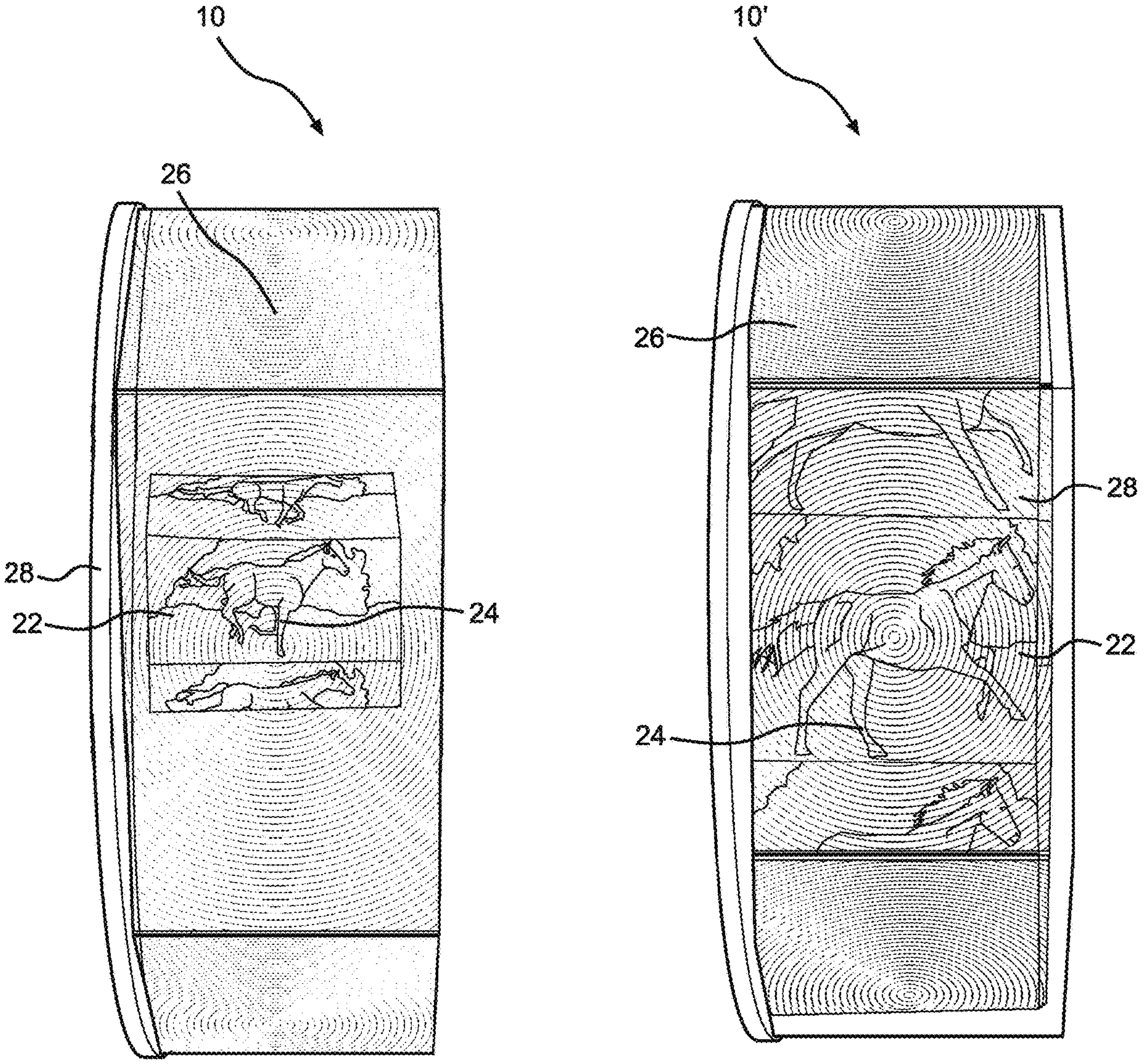
FIG. 52 comprises views in front elevation comparing animation with a single-layer lensed zoetrope and a double-layer lensed zoetrope.
Figure 53:
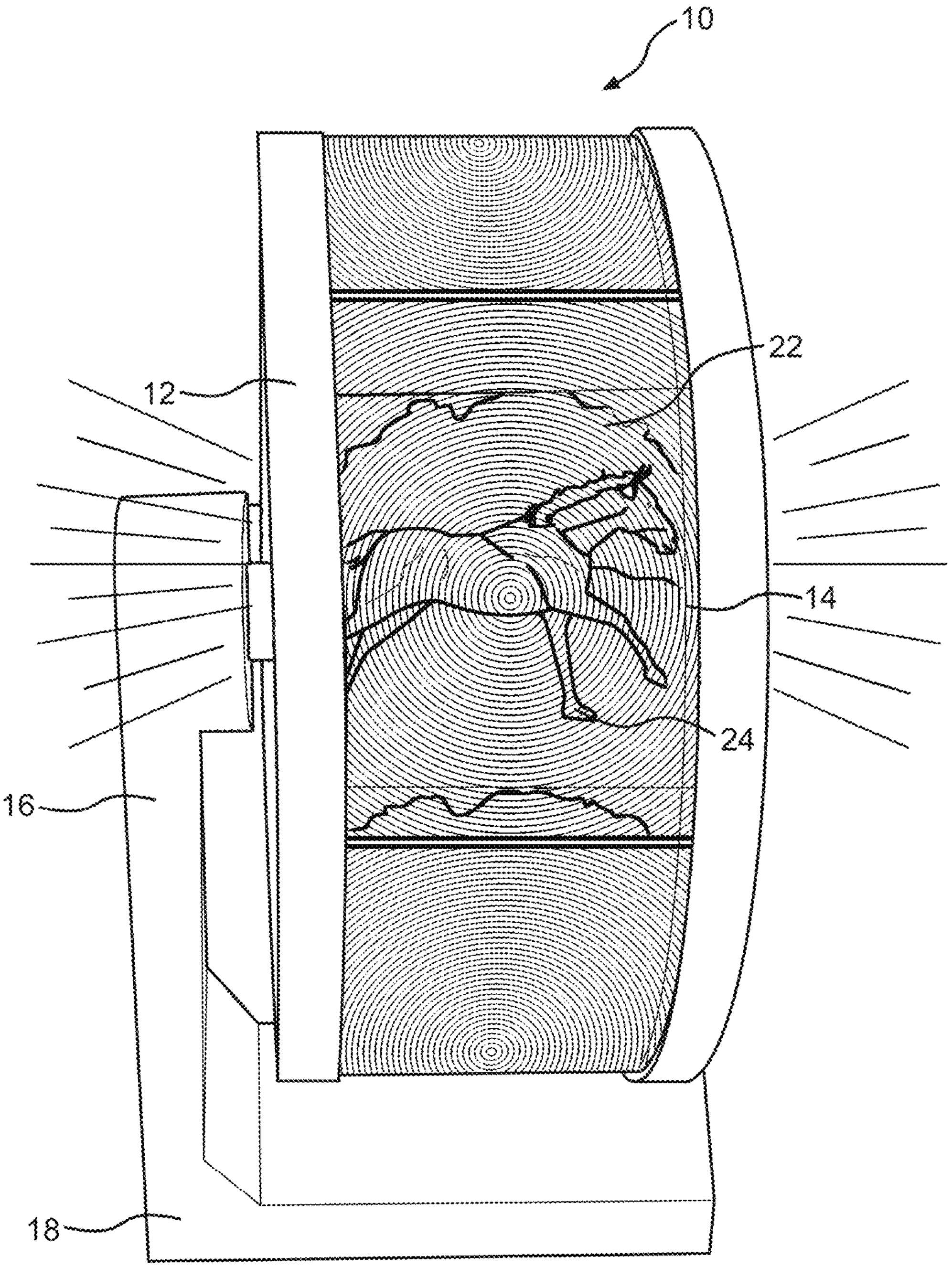
FIG. 53 is a view in front elevation of an embodiment of the convex-lensed zoetrope with an illuminated image hub.

Referring again to FIGS. 16A through 16D, it will again be appreciated that embodiments of the zoetrope 10 can vary widely in size. In this regard, it is noted that it has been found that, where the zoetrope 10 is constructed to be relatively small, the appropriate image hub diameter decreases disproportionately in relation to the decrease in the size of the outer drum 12. With that, it may be necessary to use lenses 26 of greater magnification power, such as a magnifying power in excess of 3×, or, additionally or alternatively, by employing doubled lenses 26. The effect of employing double lenses is depicted in FIG. 52. There, a small zoetrope 10 is shown with single-layer lenses 26 disposed to form the lens structure 28 in comparison to a similarly-small zoetrope 10' with double-layer lenses 26. As one can perceive, the displayed images 24 in the zoetrope 10' with double-layer lenses 26 are markedly improved in size.

Where double lenses 26 are employed, it is possible that there may be a perceived dimming of the animation. Therefore, such embodiments, indeed any embodiment of the zoetrope 10, could additionally incorporate artificial illumination. One mechanism for doing so is illustrated in FIG. 53. There, the zoetrope 10 employs a translucent, internally-illuminated image hub 14. With that, the displayed images 24 are rendered still brighter for animation. The illumination of the image hub 14 could be carried out in any appropriate manner, including by an illumination source, such as one or more light emitting diodes, disposed within the image hub 14. The illumination source can be powered in any effective way, including by battery or other electric power.

Another advantage of embodiments of the invention is that the animation strips 22 required can be of exceedingly compact relative size. While an animation strip 22 for a convex-lensed zoetrope 10 according to the present invention with a 5.25 inch outer drum 12 may employ an animation strip 22 that is 5.1 inches long in the example set forth above, a similar diameter drum version of Horner's slotted zoetrope, or Maxwell's concave lensed zoetrope, or even Reynaud's mirrored praxinoscope would require an image strip of approximately 16.48 inches in length to be seated within the inner wall of the surrounding drum. This is more than three times longer thereby consuming considerably more printing resources and material and resulting in increased costs. In this regard, it is recognized that these factors, particularly the awkward and cumbersome size of the required animation strips, have contributed to the difficulty of zoetropes of the prior art in achieving commercial success.

Figure 34:
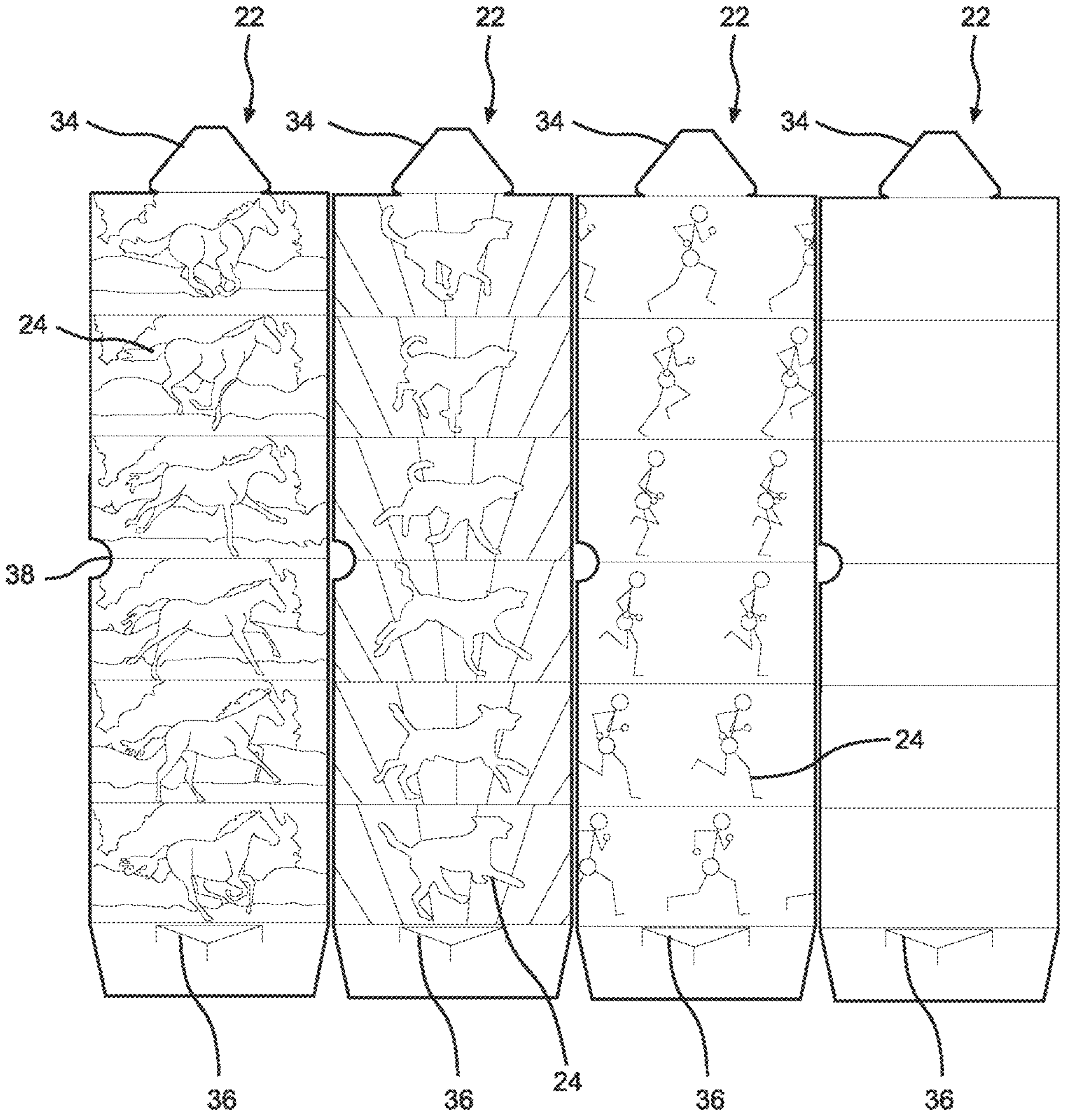
FIG. 34 is a top plan view of a kit of animation strips for the convex-lensed zoetrope.
Figure 54:
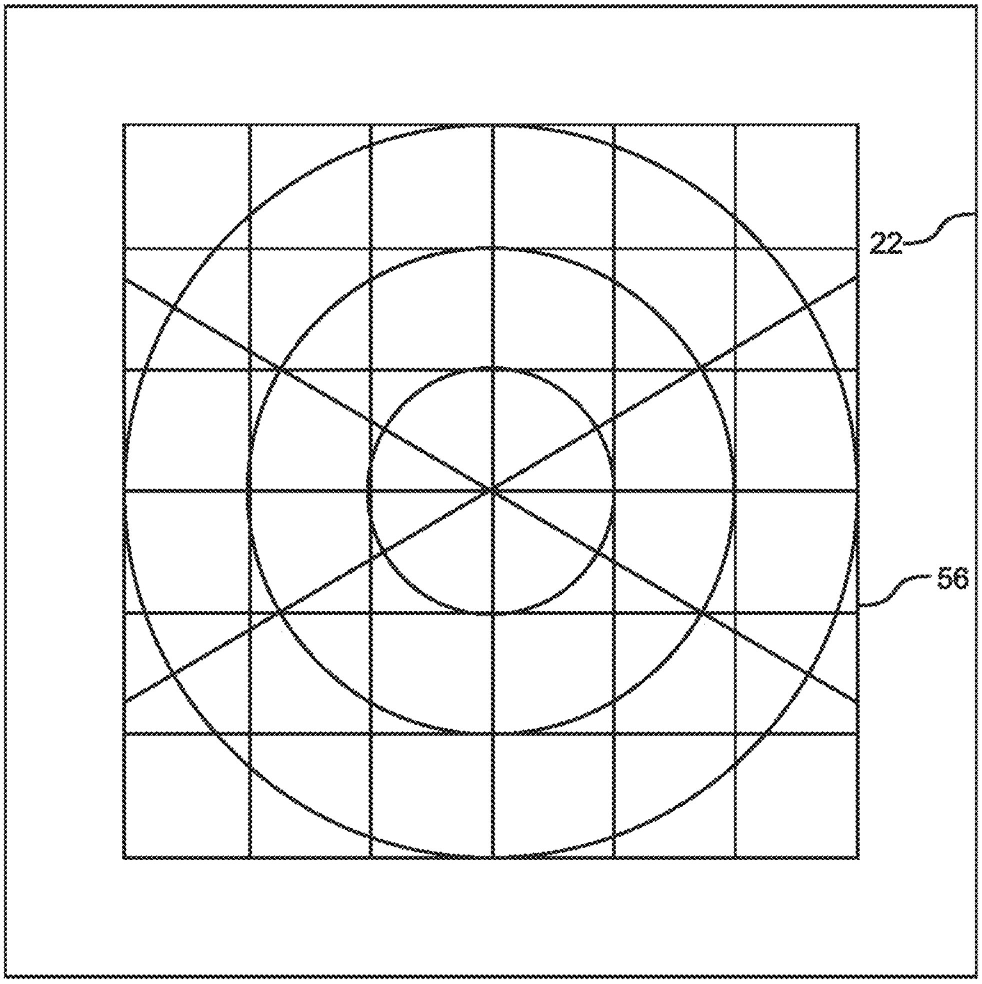
FIG. 54 is a top plan view of an animation member with a drawing guide.

Components for the zoetrope 10 or perhaps entire embodiments of the convex-lensed zoetrope 10 could be sold as a kit. For instance, with reference to FIG. 34, a kit according to the invention could include plural separate animation members 22, each with an image phase 24, or elongate animation strips 22 with plural image phases 24 disposed in series with pre-printed finished artwork. Alternatively, to encourage user interaction and play, the animation members 22, whether in the form of individual animation cards 22 or animation strips 22, can be pre-printed with outlined figures to be colored in, stick figures, outlines, or other drawing guides upon which the user can impose their own style. One such embodiment of the animation member 22 is shown in FIG. 54. There, the animation member 22 comprises an animation card 22 to be applied to an image hub 14 wherein the animation member 22 has a drawing guide 56 comprising graph cubes, radiating lines, and concentric circles, lightly printed thereon to ensure that an image applied by a user is centered and proportioned as the user may wish. Still further, blank strips 22 could be provided upon which original animated artwork can be drawn as depicted.

Figure 55:
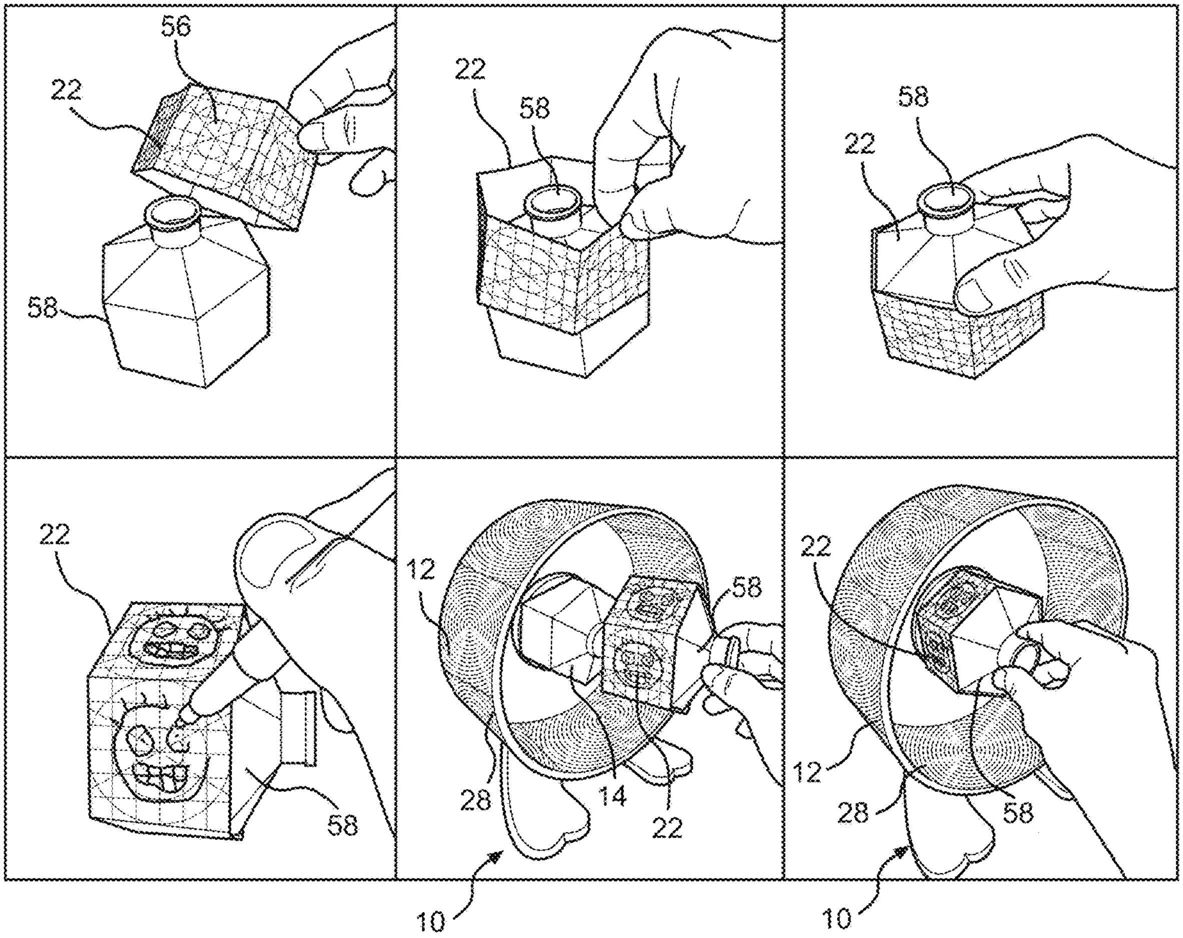
FIG. 55 is a series of perspective views of an embodiment of the convex-lensed zoetrope with an image shell.

It is also possible within the scope of the invention for the animation member or members 22, whether in the form of animation strips 22 or individual animation cards 22, to be permanently or removably and replaceably retained relative to an image shell 58 that can be removed and replaced to be concentrically disposed within the outer drum 12 and in relation to the lens structure 28. Such an image shell 58 is depicted in the series of images of FIG. 55. It would be possible and within the scope of the invention for the removable image shell 58 to form the image hub 14 when concentrically disposed within the outer drum 12, or the image shell 58 can be selectively applied to receive the image hub 14 concentrically therewithin. Under such constructions, the animation member or members 22 can be selectively applied to the image shell 58, and then the image shell 58 and the animation member or members 22 so coupled can be inserted in place within the lens structure 28 and the outer drum 12, such as by being received over the image hub 14 or retained to form the image hub 14. The image shell 58 could be retained in any appropriate manner, including by a friction fit, a snap-fit arrangement, fasteners, or any other fastening mechanism or combination thereof. In the manifestation of FIG. 55, an animation member 22 is employed with plural spaced drawing guides 56. The animation member 22 could permanently receive images onto the drawing guides 56, such as in a paper embodiment, or the images could be erasable, such as through the use of dry-erase material.

Figure 56:
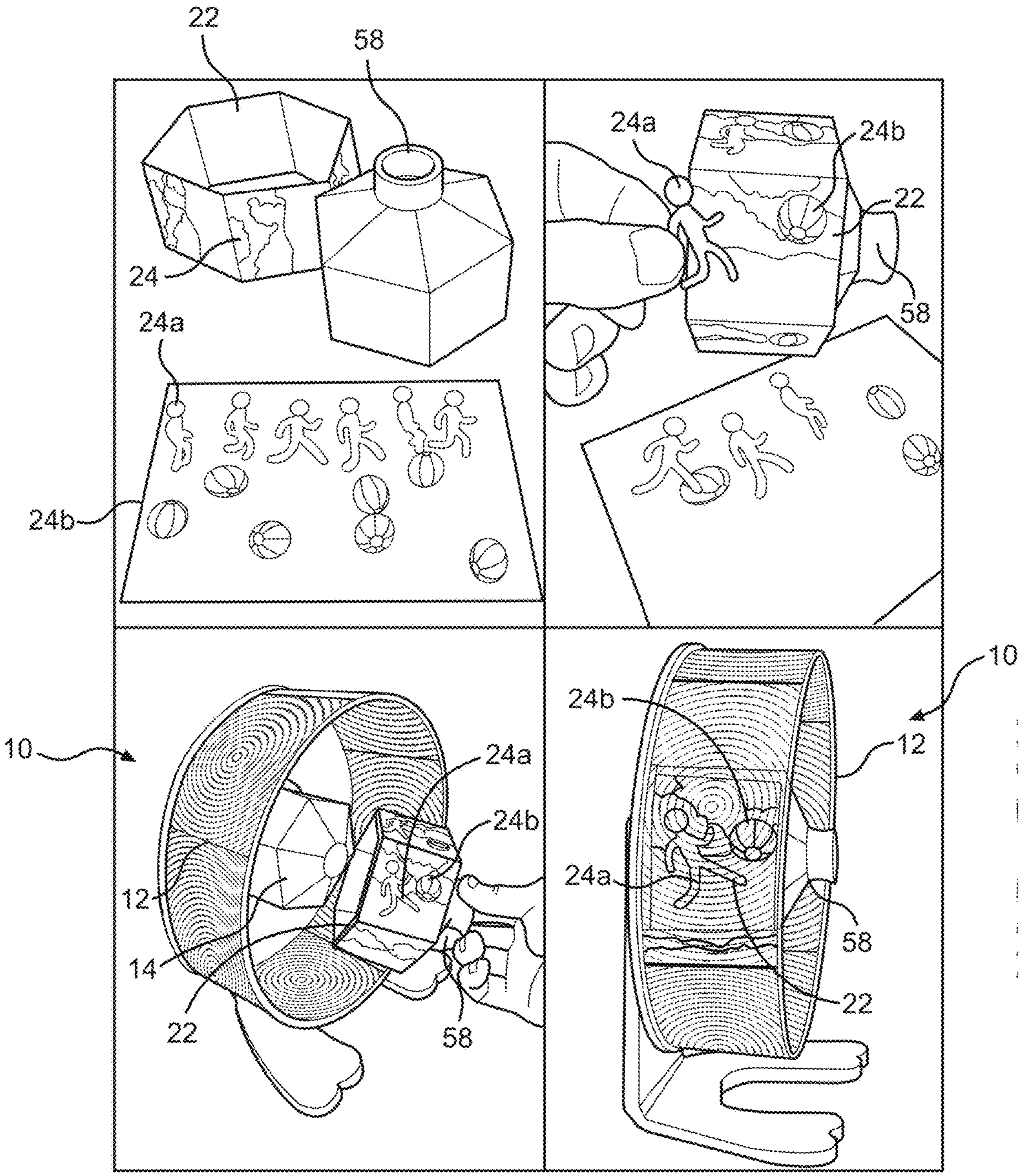
FIG. 56 is a series of perspective views of an embodiment of the convex-lensed zoetrope with a magnetic image shell for removably retaining plural image components.

Turning to FIG. 56, it is possible for image components 24A, 24B, **24*n* to be selectively applied and retained relative to the image hub 14, whether directly or whether again by use of an image shell 58 that is removably and replaceably retained concentrically within the outer drum 12. For instance, where the image shell 58 or the image hub 14 has one or more magnetic panels as shown, image components 24A, 24B, 24*n* can be selectively adhered to the image hub 14 or the image shell 58 for application over the image hub 14. However, it will be understood that image components 24A, 24B, 24*n* could be otherwise retained, such as by pressure-sensitive adhesive, static cling, adhesive tape, or any other effective mechanism. Some or all of the image components 24A, 24B, 24*n* can be configured to represent image phases as is shown by the image components 24A representative of a human running. The image components 24A, 24B, 24*n* could be applied alone, or the image components 24A, 24B, 24*n* could be applied over a background image member 22, in this case an animation strip 22, which could itself have a series of images 24** disposed thereon.

Figure 35:
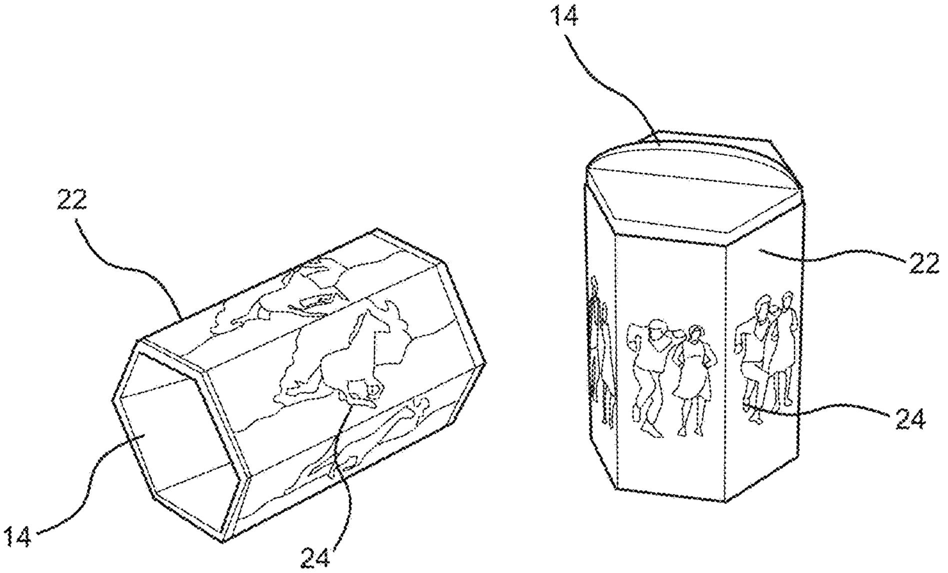
FIG. 35 is a perspective view of first and second image hubs with images disposed thereon with orientations respectively perpendicular to and aligned with a longitudinal of the image hub.
Figure 36:
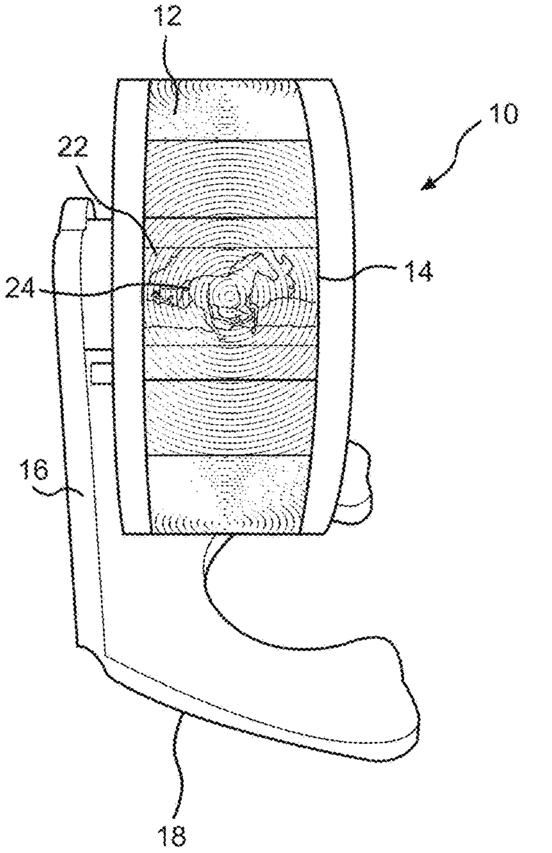
FIG. 36 is a view in front elevation of a convex-lensed zoetrope depicting the head-on viewing of a displayed animating image with the image oriented perpendicular to the longitudinal of the image hub.
Figure 37:
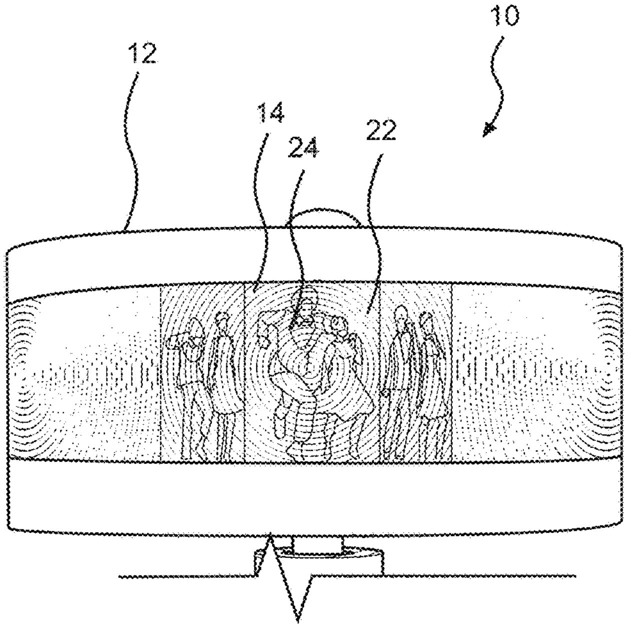
FIG. 37 is a view in front elevation of a convex-lensed zoetrope depicting the head-on viewing of a displayed animating image with the image oriented aligned with the longitudinal of the image hub.

As FIG. 35 shows, the images 24 can be disposed on the animation strip 22 and thus on the image hub 14 with images 24 disposed thereon having orientations perpendicular to a longitudinal of the image hub 14, or the images can be aligned with the longitudinal of the image hub 14. FIG. 36 depicts a convex-lensed zoetrope 10 illustrating the head-on viewing of a displayed animating image with images 24 oriented perpendicular to the longitudinal of the image hub 14 whereby the zoetrope 10 will preferably be viewed in a vertically-disposed manner with the outer drum 12 and the image hub 14 rotating about a horizontal axis. The convex-lensed zoetrope 10 illustrated in FIG. 37, meanwhile, displays images 24 oriented in alignment with the longitudinal of the image hub 14 such that the zoetrope 10 can be viewed in a horizontally-disposed manner with the outer drum 12 and the image hub 14 rotating above a vertical axis.

The vertical orientation may be preferred in certain instances in that it requires less display space while providing easy, direct, straight-on viewing regardless of whether it is viewed from a standing or sitting position as the animated image automatically centers to the observer's eye. The horizontal orientation may be preferred in other instances in that, for instance, it permits simultaneous viewing of the animation provided by the zoetrope 10 by all who surround it.

Figure 38:
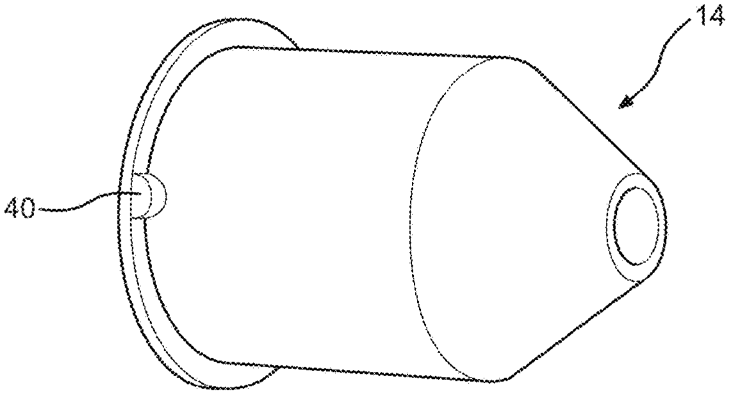
FIG. 38 is a perspective view of an image hub according to the invention.
Figure 39:
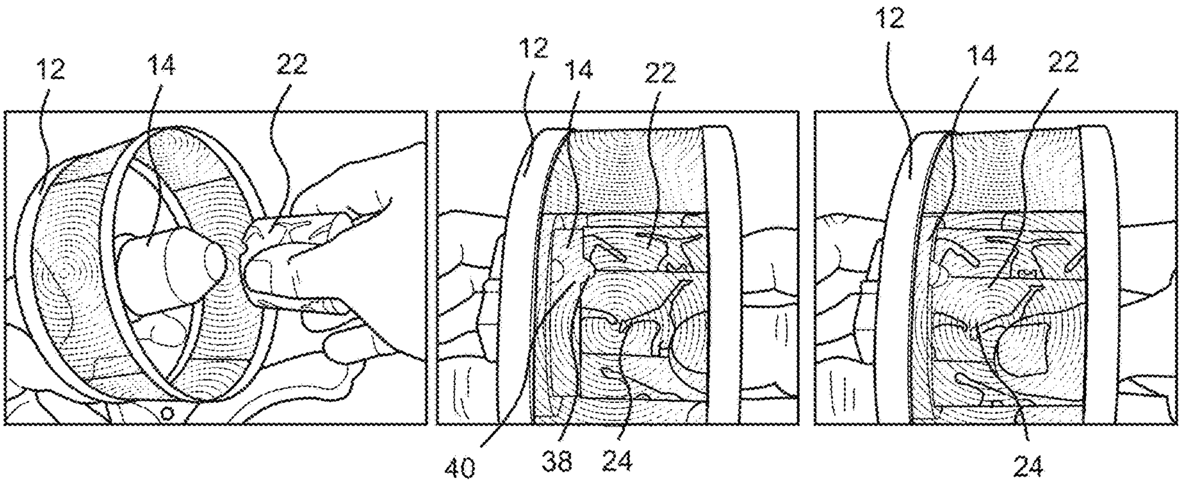
FIG. 39 comprises a series of perspective views depicting the application of an animation cylinder to an image hub pursuant to the invention.
Figure 40:
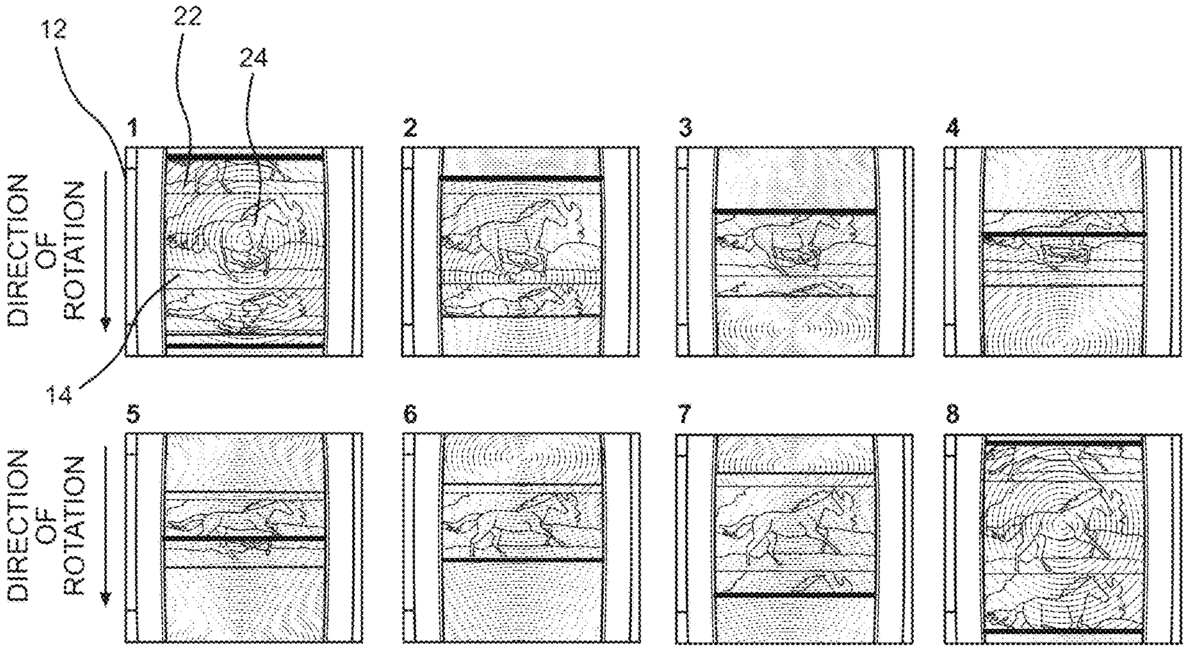
FIG. 40 comprises a series of views in front elevation depicting the visual transition between succeeding images during rotation of the outer drum and image hub of the convex-lensed zoetrope.

As FIG. 38 shows, the receiving or distal end of the image hub 14 can be tapered to receive animation strips 22 more easily as the strip 22 is fitted onto the hub 14 by the user. As can be perceived by combined reference to FIGS. 34 and 39, to ensure that each individual image 24 on the strip 22 will be centered to each lens, one or more pre-cut notches 38 in the edge of the animation strip 22 cylinder can be made to engage with a small protuberance 40 disposed at the proximal end of the image hub 14. Where multiple notches 38 are provided, any of the notches 38 can be engaged with the protuberance 40 since their purpose and effect is only to center each image 24 in relation to a lens 26 of the lens structure 28. Of course, other alignment methods could be employed, including by way of example and not limitation, simple alignment indicators, and it will also be understood that the notch or notches 38 and the protuberance or protuberances 40 could be oppositely disposed with the animation strip 22 having one or more protuberating portions and the image hub 14 having one or more receiving notches 38.

In operation, after the animation strip 22 has been fitted to the image hub 14 by the user, the outer drum 12 can be rotated. Viewed through the lenses 26 retained to rotate with the outer drum 12, the virtual images provided by images 24 on the animation strip 22 will be perceived as being located at the central axis of the outer drum 12 and of the zoetrope 10 in general. As FIG. 30 shows, the virtual image appears to stop momentarily before being replaced by the next image. Under the structure and method so described and illustrated, the zoetrope 10 thus achieves its goal of providing a relatively inexpensive, hand-operated zoetrope 10 capable of displaying bright, sharp, non-distorted animating images that are unobstructed, of appreciable size, and that can be viewed in a direct, straight-on manner.

Figure 44:
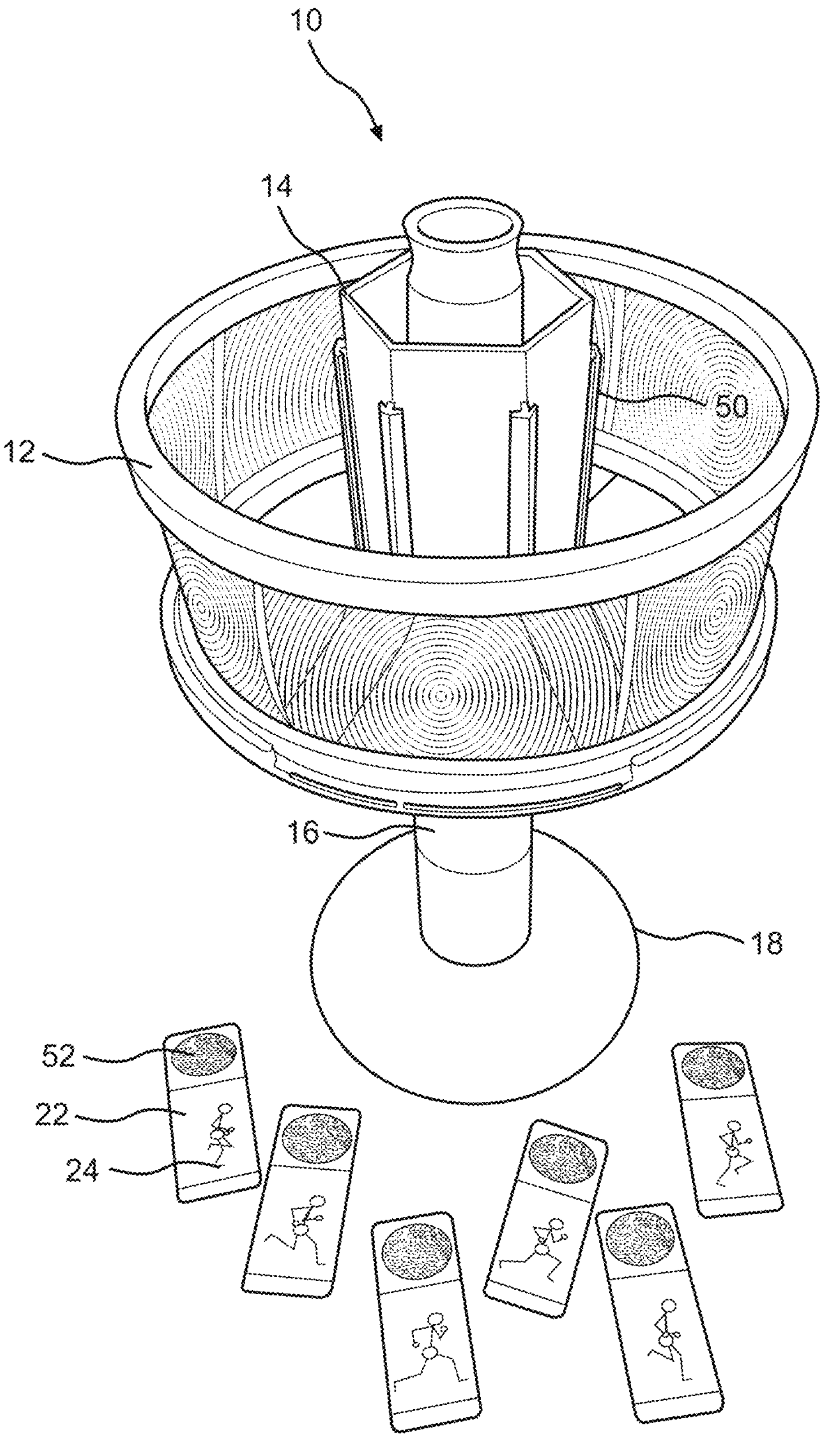
FIG. 44 is a perspective view of another embodiment of the convex-lensed zoetrope.

As in FIGS. 44 through 48, for example, yet further embodiments of the invention are possible wherein plural separate animation members 22, each retaining one or more images 24 thereon, can be selectively applied to overlie the image hub 14. Each card 22 retains a specific phase of the animation intended to be displayed with the present, non-limiting example having the images 24 disposed for animation in a horizontally-disposed outer drum 12 and image hub 14 disposition. As FIG. 44 illustrates, the image hub 14 can be faceted with each facet having a slot 50 for receiving an animation member 22 in the form of an animation card 22 retaining one or more images 24. In other embodiments, the image hub 14 could be cylindrical or otherwise shaped. Other retention mechanisms for the animation cards 22 are possible and within the scope of the invention. For instance, animation cards 22 could alternatively be retained by adhesive, by magnetism, or by any other method or combination thereof.

Figure 45:
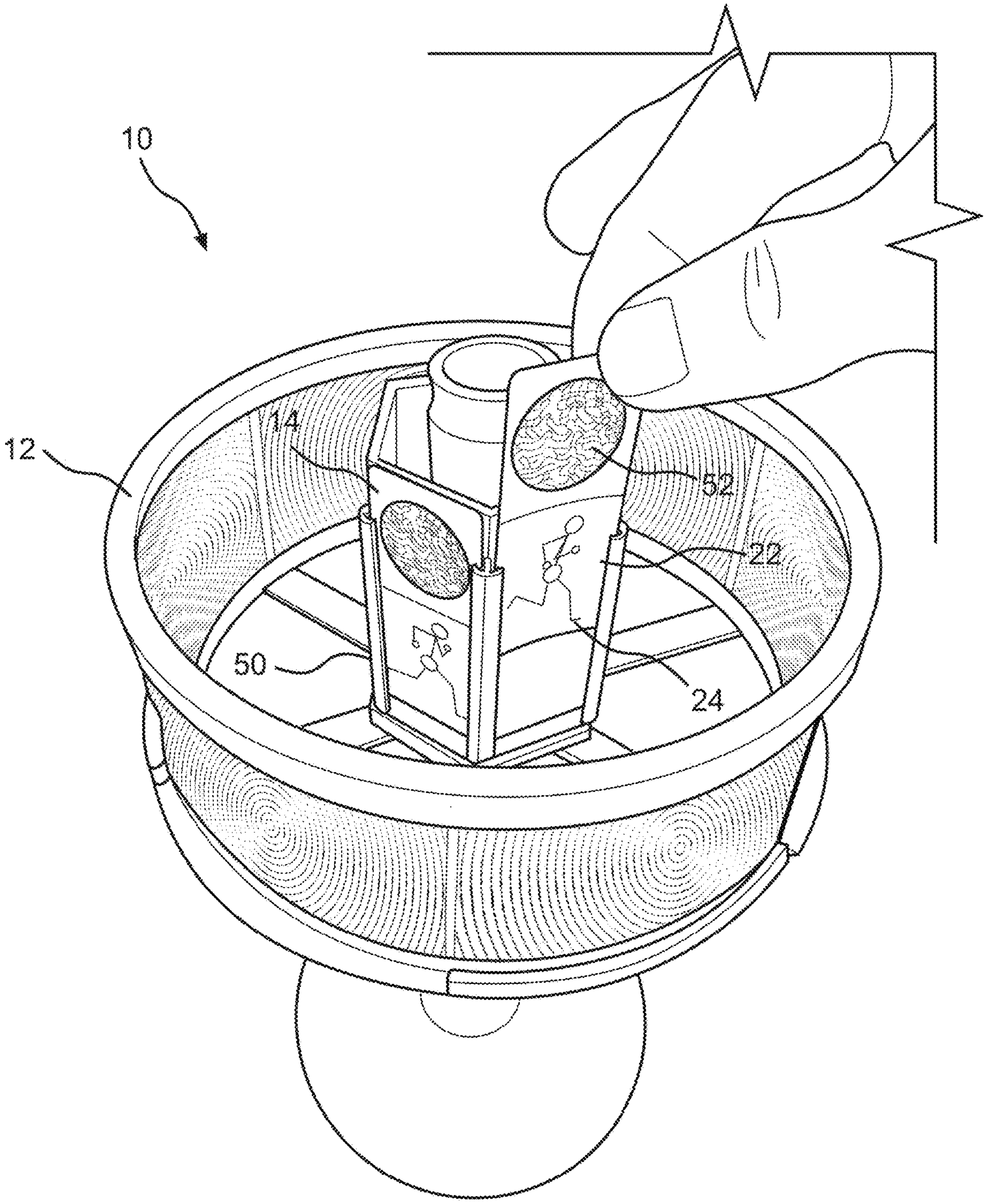
FIG. 45 is a perspective view of the convex-lensed zoetrope of FIG. 44 during the insertion of individual animation cards.

With this, a user can insert a series of animation cards 22 into the several slots 50 of the image hub 14 as is illustrated, for example, in FIG. 45. Where the animation cards 22 are placed in the correct order of animation, a rotation of the outer drum 12 and the image hub 14 will produce an animation of the images 24 disposed on the series of animation cards 22. However, where the animation cards 22 are not placed in the correct order of animation, the resulting images 24 viewed through the outer drum 12 will not animate properly. Thus, such embodiments add to the play value of the zoetrope 10 by enabling a user to study each animation phase and to discern and, as necessary, to revise and correct the proper order of animation cards 22 to produce the intended sequential animation effect.

Figure 46:
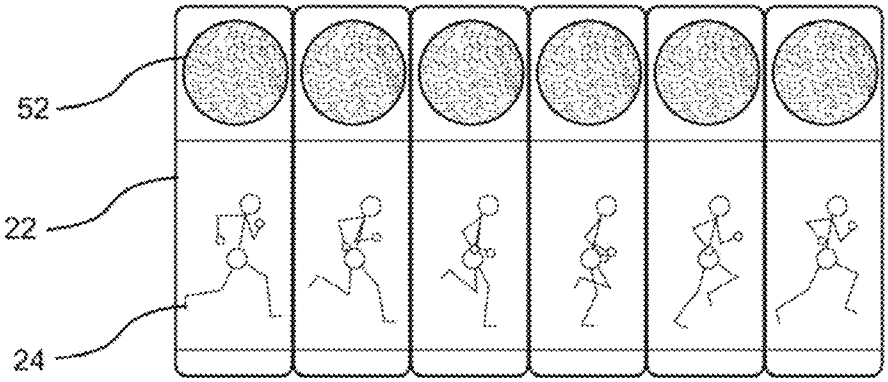
FIG. 46 is a view in front elevation of a series of animation cards for the convex-lensed zoetrope.
Figure 47:
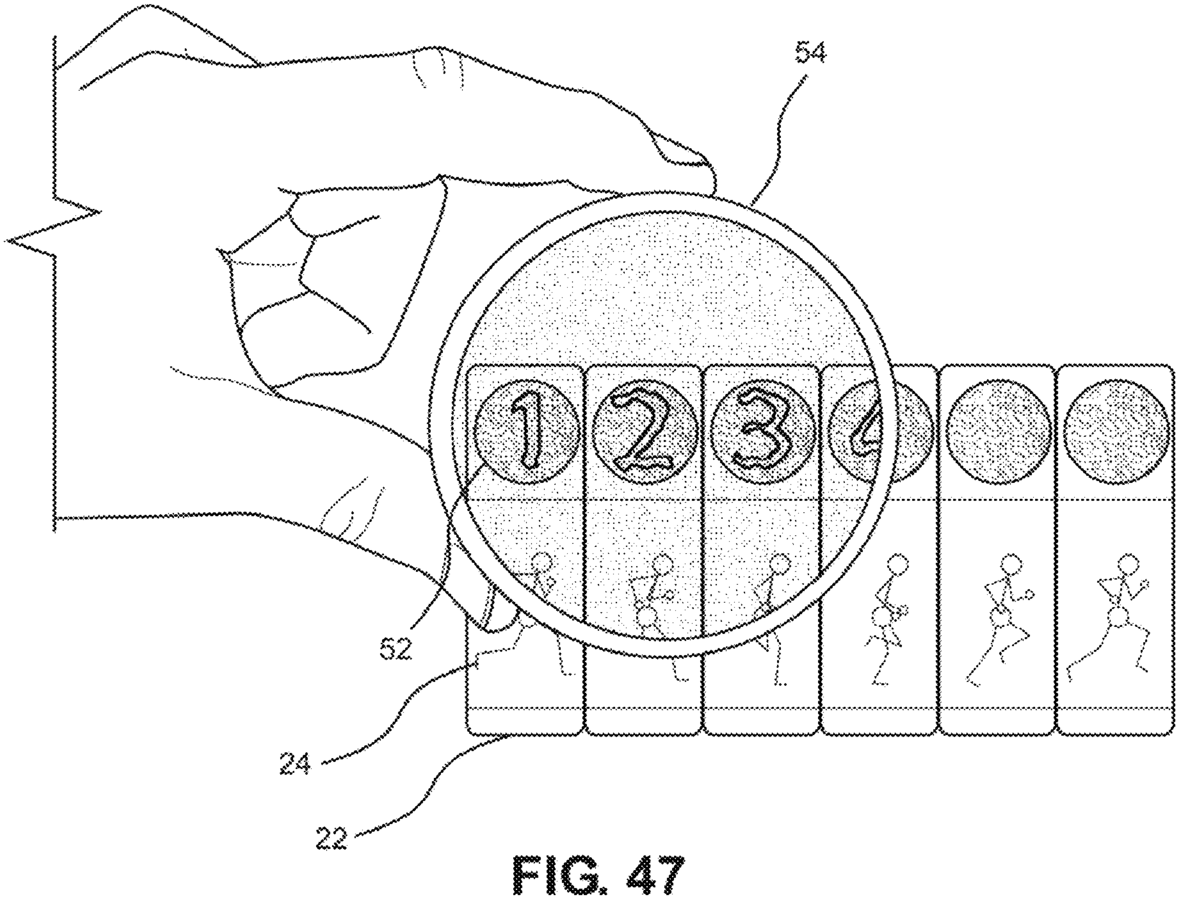
FIG. 47 is a view in front elevation of the series of animation cards for the convex-lensed zoetrope of FIG. 46 with a filter applied to reveal camouflaged place indications of a plurality of the animation cards.
Figure 48:
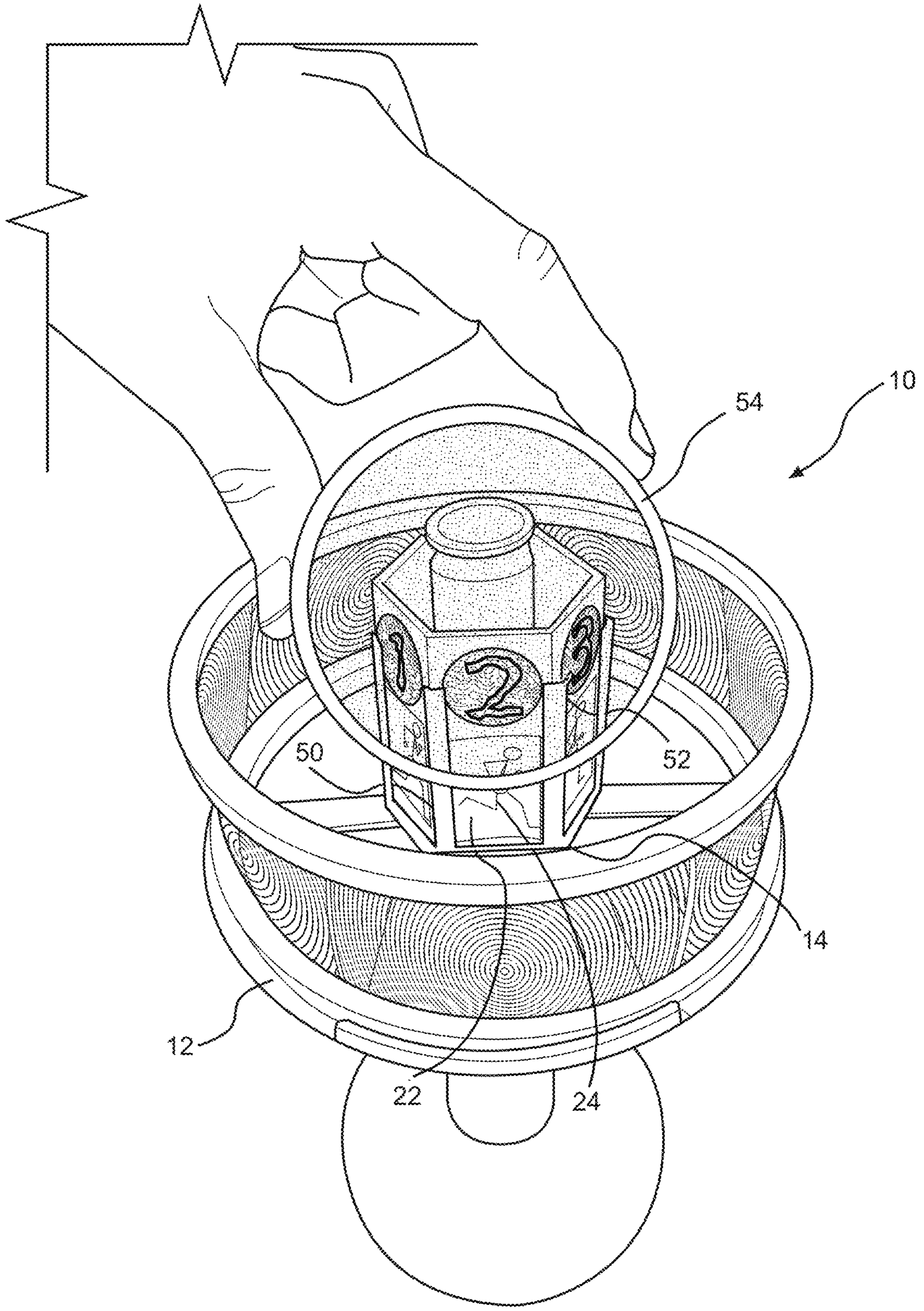
FIG. 48 is a perspective view of the convex-lensed zoetrope of FIG. 44 with animation cards disposed therein and with the place indications of the cards revealed by a filter.

To enable a detection and confirmation of the proper order of the animation cards 22, the cards 22 can be marked or coded. The marking or coding can be hidden during normal viewing of the fronts of the animation cards 22. In certain practices, this could be accomplished by a practice as simple as printing a number, letter, or other place indication on the fronts or backs of the several animation cards 22 so that a person could refer to and rely on the place indication to place and install the cards 22 in order or to confirm the proper order of the cards 22 once the cards 22 are organized according to the person's perception of the proper order. In the depicted embodiment, however, the place indication is disposed within a camouflaged area 52 on the front of each animation card 22. The camouflaged area 52 hides the place indication, such as through one of the color-scrambling techniques known to the art, to be decoded by application of an optical filter 54, such as a red filter. As FIG. 46 shows, the place indications are indecipherable to the naked eye, but the place indications are revealed when the camouflaged areas 52 are viewed through the filter 54. With that, a user can place the several animation cards 22 on a surface as in FIG. 47 or within the zoetrope 10 as in FIG. 48, and then the filter 54 can be applied to confirm that the animation cards 22 have been correctly ordered or to learn that the cards 22 should be re-ordered.

Embodiments of the convex-lensed zoetrope 10 are capable of creating a convincing animation effect without electricity or motors. This further differentiates the zoetrope 10 from powered animation devices, such as devices that must be illuminated by strobes or other lighting to increase brightness artificially or to produce animation. Instead, since the outer drum 12, the lenses 26, and other components of the zoetrope 10 are generally transparent, animated images are readily and brightly illuminated by natural, ambient light without a need for strobe effects. This is also in marked deviation from prior art zoetropes, such as that taught by Horner, where the opaque obstructions between the slots of the zoetrope dramatically reduce the brightness of the viewed image such that the user must often resort to artificially illuminating the interior of the drum to brighten the images sufficiently for viewing. Likewise, in a mirrored praxinoscope, it can be a challenge to sufficiently illuminate images buried deep inside a surrounding drum. Conversely, the transparency of the components of the present zoetrope 10 permits a harnessing of the most available ambient light to illuminate the animated images 24 naturally.

Figure 41:
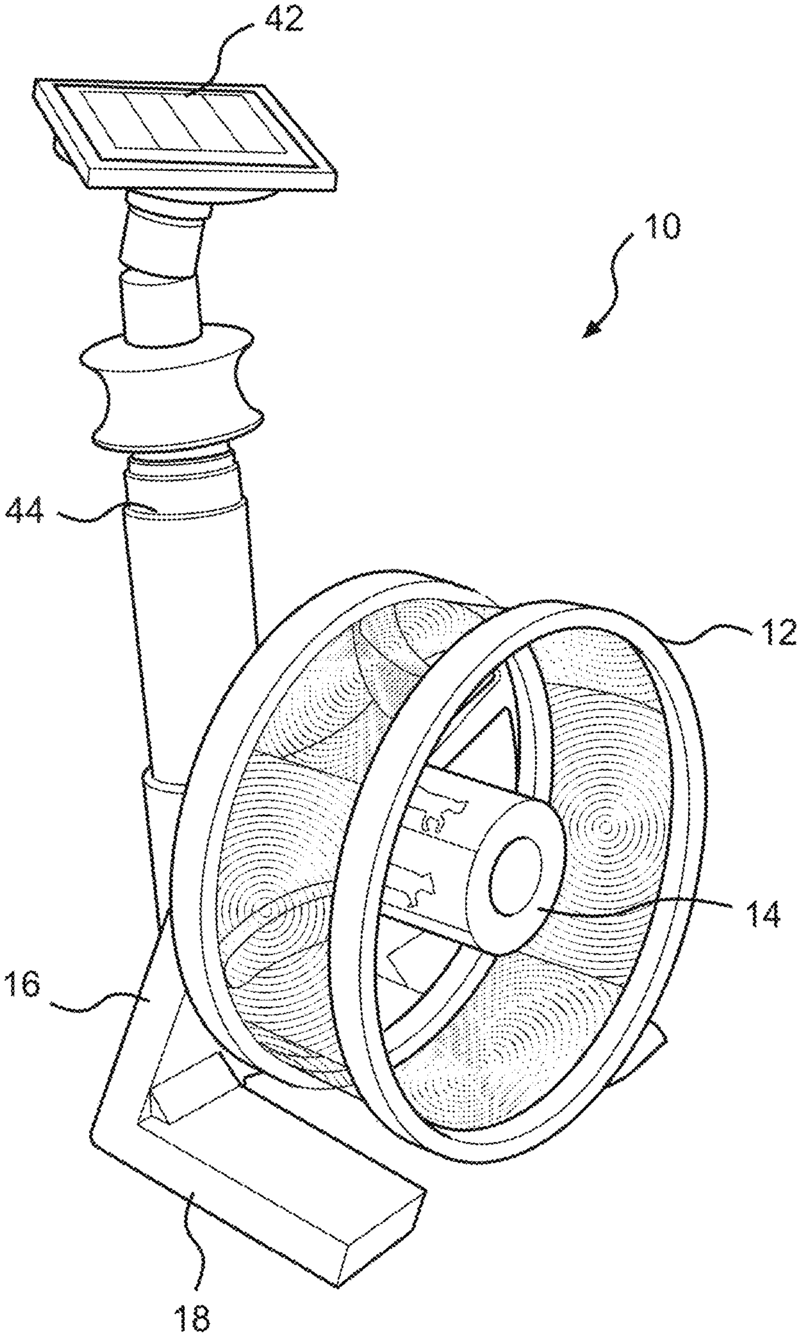
FIG. 41 is a perspective view of an alternative embodiment of the convex-lensed zoetrope with a photovoltaic panel in a lowered position.
Figure 42:
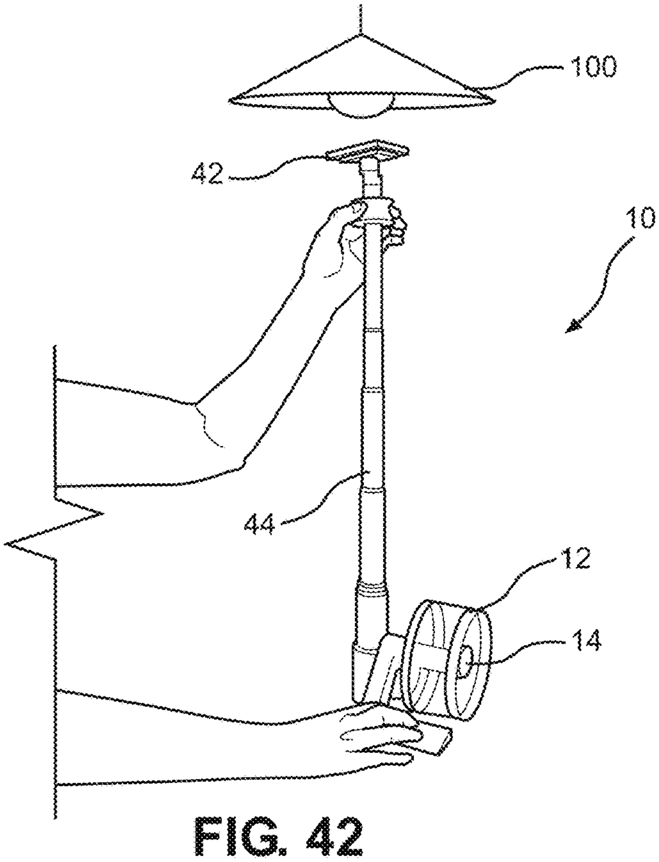
FIG. 42 is a perspective view of the convex-lensed zoetrope of FIG. 41 with the photovoltaic panel in a raised position.
Figure 43:
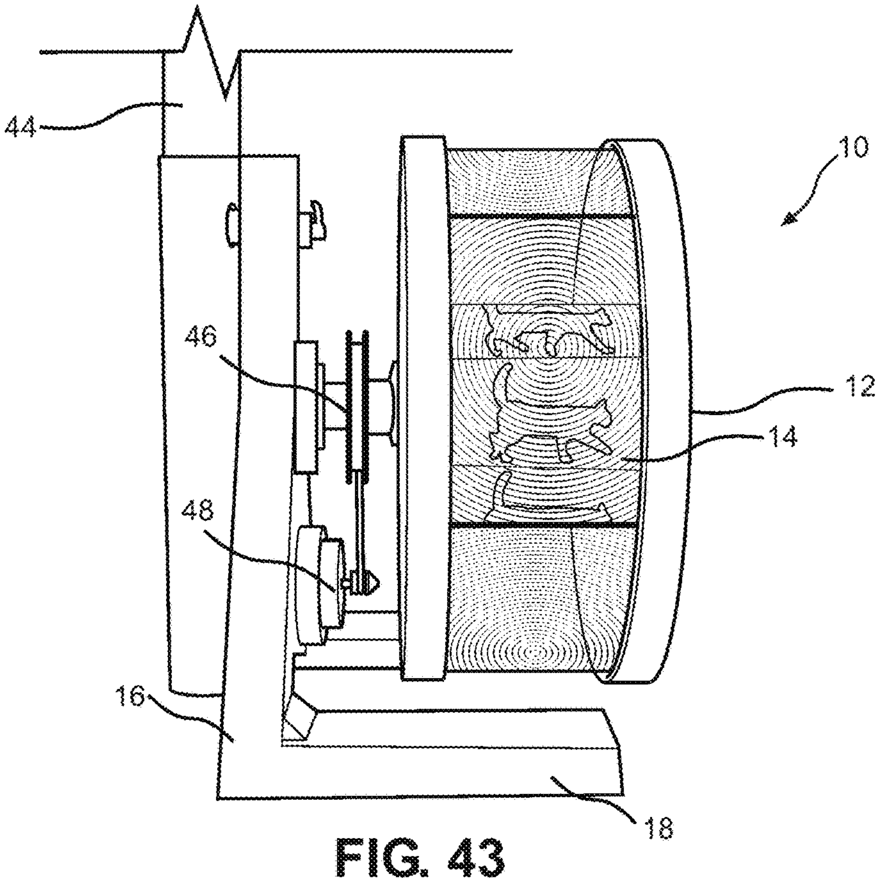
FIG. 43 is a view in front elevation of the motorization system of the convex-lensed zoetrope of FIG. 41.

While the ability to create convincing animation without a need for electricity or motors is indeed useful and advantageous, mechanically cranked and electrically powered convex-lensed zoetropes 10 remain within the scope of the invention. Motorized versions of the convex-lensed zoetrope 10 could receive electrical power, for instance, from one or more batteries, from a source of alternating current, or even from photovoltaic power as in the embodiment of FIGS. 41 through 43. There, the convex-lensed zoetrope 10 again has an outer drum 12 retained for concentric rotation with an image hub 14 with the drum 12 and hub 14 being rotatably supported by a support arm 16 that is in turn supported by a support base 18. A photovoltaic panel 42 is pivotally retained at the distal end of an extendable support arm 44 that is retained by and extends from the support arm 16. The photovoltaic panel 42 harvests electrical power from the Sun or from an artificial light source 100 to power an electric motor 48 retained by the support arm 16 and support base 18 through wiring traversing from the panel 42 to the motor 48. The electric motor 48 actuates a drive system 46 to rotate the outer drum 12 and the image hub 14. Advantageously, through the ability to adjust the photovoltaic panel 42 in height and angular disposition, the panel 42 can be caused to receive optimal photovoltaic power while the outer drum 12 and the image hub 14 can be positioned for optimal viewing.

With certain details and embodiments of the present invention for a convex-lensed zoetrope 10 disclosed, it will be appreciated by one skilled in the art that numerous changes and additions could be made thereto without deviating from the spirit or scope of the present invention. This is particularly true when one bears in mind that the presented preferred embodiments merely exemplify the broader invention revealed herein. Accordingly, it will be clear that those with major features in mind could craft embodiments that incorporate those major features while not incorporating all of the features included in the preferred embodiments.

Therefore, the following claims shall define the scope of protection to be afforded to the invention. Those claims shall be deemed to include equivalent constructions insofar as they do not depart from the spirit and scope of the invention. It must be further noted that a plurality of the following claims may express, or be interpreted to express, certain elements as means for performing a specific function, at times without the recital of structure or material. As the law demands, any such claims shall be construed to cover not only the corresponding structure and material expressly described in this specification but also all legally-cognizable equivalents thereof.

What is claimed as deserving of Letters Patent is:

1. A zoetrope for providing a perceived animation of images, the zoetrope comprising:

a plurality of convex lenses retained along a ring shape to form a lens structure, wherein the convex lenses are positioned to have foci within the ring shape;

an inner image hub, wherein the lens structure and the image hub are retained for concentric rotation and wherein the image hub is adapted to retain images in series for animation;

whereby, through a rotation of the inner image hub and the plurality of convex lenses, the zoetrope is capable of displaying bright, sharp, non-distorted animating images that are unobstructed, of appreciable size, and that can be viewed through the lenses of the lens structure in a direct, straight-on manner.

2. The zoetrope of claim 1, wherein the plurality of convex lenses comprise a plurality of Fresnel convex lenses.

3. The zoetrope of claim 2, wherein the plurality of Fresnel convex lenses comprise Fresnel lens sheets.

4. The zoetrope of claim 3, wherein each of the plurality of Fresnel convex lenses is flexible and wherein the plurality of Fresnel convex lenses are adapted to be curved to form a substantially cylindrical lens structure.

5. The zoetrope of claim 3, wherein each of the plurality of Fresnel lens sheets has a lensed surface and a flat surface and wherein each of the Fresnel lens sheets are positioned with the lensed surface facing outwardly and the flat surface facing inwardly.

6. The zoetrope of claim 1, further comprising an outer drum retained for concentric rotation with the inner image hub wherein the plurality of convex lenses are retained by the outer drum.

7. The zoetrope of claim 6, wherein the outer drum is at least partially transparent.

8. The zoetrope of claim 6, wherein the image hub and the outer drum are rotatably supported by a support arm.

9. The zoetrope of claim 8, further comprising a base wall, wherein the base wall is rotatably retained by the support arm, and wherein the image hub and the outer drum are retained to rotate together by the base wall whereby the outer drum, the image hub, and the base wall together form a rotatable structure.

10. The zoetrope of claim 1, further comprising an animation member with a plurality of images disposed thereon for being received to encircle the image hub.

11. The zoetrope of claim 10, wherein the animation member comprises an animation strip adapted to be formed into a cylinder.

12. The zoetrope of claim 10, wherein the animation member has an alignment formation and wherein the image hub has a corresponding alignment formation adapted for engaging the alignment formation of the animation member thereby to facilitate an alignment of the animation member with the image hub.

13. The zoetrope of claim 1, wherein the plurality of convex lenses are disposed in a polygonal lens structure wherein each lens forms a side of the polygonal lens structure.

14. The zoetrope of claim 1, wherein the image hub has a diameter calculated by use of the following formula:

$$o = \frac{1}{\frac{1}{i} + \frac{1}{f}}$$

$o$ = object distance $i$ = virtual image distance $f$ = focal distance of lens.

15. The zoetrope of claim 1, wherein the image hub has a diameter determined by use of a target template, wherein the target template has a plurality of lines that emanate from a center of the target template, the plurality of lines corresponding in plurality to the plurality of convex lenses, and wherein the target template has a plurality of concentric circles in spaced relation concentric with the center of the target template.

16. The zoetrope of claim 15, wherein the diameter of the image hub is further determined by disposing the target template concentrically within the lens structure, rotating the lens structure with the target template therewithin and the image hub, and applying a circle onto the target template while the target template, the lens structure, and the image hub are rotating with the circle so applied having a diameter corresponding to an ideal diameter of the image hub.

17. The zoetrope of claim 1, wherein the image hub has a distal end that is tapered to receive an animation member thereover.

18. The zoetrope of claim 1, wherein the image hub is adapted to retain a plurality of animation members in series for animation, wherein each animation member has one or more images thereon.

19. The zoetrope of claim 18, wherein the image hub has a plurality of slots therearound, each slot adapted for selectively receiving and retaining an animation member.

20. The zoetrope of claim 18, further comprising a plurality of animation members with at least one image disposed on each animation member wherein the animation members are adapted for being received to encircle the image hub.

21. The zoetrope of claim 20, wherein each of the plurality of animation members comprises an animation card with at least one image of a series of images disposed thereon, wherein the series of images has an order of animation, and further comprising a camouflaged place indication indicative of the respective place in the order of animation of the animation card wherein the camouflaged place indication is adapted to be revealed by application of an optical filter.

22. The zoetrope of claim 1, further comprising an electric motor operable to rotate the inner image hub and the plurality of convex lenses and a photovoltaic panel electrically connected to the electric motor to provide electricity to the electric motor.

23. The zoetrope of claim 22, further comprising a support structure for rotatably supporting the image hub and the plurality of convex lenses and further comprising an extendable support arm with a proximal end retained by the support structure wherein the photovoltaic panel is retained by a distal end of the extendable support arm.

24. The zoetrope of claim 1, wherein the plurality of convex lenses are retained along the ring shape to form the lens structure by a first annular retaining rim wherein the plurality of convex lenses are received and retained by the annular retaining rim.

25. The zoetrope of claim 24, further comprising a second annular retaining rim, wherein each of the first and second retaining rims has an annular groove therein for receiving edges of the convex lenses.

26. The zoetrope of claim 1, wherein the image hub is magnetized for selectively retaining one or more animation members relative to the image hub.

27. The zoetrope of claim 1, wherein the image hub is illuminated for illuminating images retained relative to the image hub.

28. The zoetrope of claim 1, further comprising an image shell for being selectively received over the image hub wherein the image shell is adapted to retain images in series for animation.

29. A zoetrope for providing a perceived animation of images, the zoetrope comprising:

an inner image hub, wherein the image hub is adapted to retain images in series for animation;

an outer drum retained for concentric rotation with the inner image hub, wherein the outer drum is at least partially transparent;

a plurality of convex lenses retained along a ring shape to form a lens structure, wherein the plurality of convex lenses are retained by the outer drum, and wherein the convex lenses are positioned to have foci within the ring shape;

whereby, through a rotation of the inner image hub, the outer drum, and the plurality of convex lenses, the zoetrope is capable of displaying bright, sharp, non-distorted animating images that are unobstructed, of appreciable size, and that can be viewed through the lenses of the lens structure in a direct, straight-on manner.

30. The zoetrope of claim 29, wherein the plurality of convex lenses comprise a plurality of Fresnel convex lenses.

31. The zoetrope of claim 30, wherein each of the plurality of Fresnel lens sheets has a lensed surface and a flat surface and wherein each of the Fresnel lens sheets are positioned with the lensed surface facing outwardly and the flat surface facing inwardly.

32. The zoetrope of claim 29, further comprising an animation member with a plurality of images disposed thereon for being received to encircle the image hub.

33. The zoetrope of claim 32, wherein the animation member comprises an animation strip adapted to be formed into a cylinder.

34. The zoetrope of claim 33, wherein the animation member has an alignment formation and wherein the image hub has a corresponding alignment formation adapted for engaging the alignment formation of the animation member thereby to facilitate an alignment of the animation member with the image hub.

35. The zoetrope of claim 29, wherein the plurality of convex lenses are disposed in a polygonal lens structure wherein each lens forms a side of the polygonal lens structure.

36. The zoetrope of claim 29, wherein the image hub has a distal end that is tapered to receive an animation member thereover.

* * * * *